US012448588B2

(12) United States Patent
Trambitas et al.

(10) Patent No.: US 12,448,588 B2
(45) Date of Patent: Oct. 21, 2025

(54) COMPOSITION COMPRISING BIOSURFACTANT AND PERSICOMYCIN (3-(3'HYDROXY)HYDROXY FATTY ACID)

(71) Applicant: Evonik Operations GmbH, Essen (DE)

(72) Inventors: Alexandra Trambitas, Alzenau (DE); Jochen Kleinen, Heinsberg (DE); Jakob Müller, Haltern am See (DE); Monica Desiree Van Logchem, PA Zevenbergen (NL); David Voigtländer, Duesseldorf (DE)

(73) Assignee: Evonik Operations GmbH, Essen (DE)

( * ) Notice: Subject to any disclaimer, the term of this patent is extended or adjusted under 35 U.S.C. 154(b) by 0 days.

(21) Appl. No.: 18/873,976

(22) PCT Filed: Jun. 19, 2023

(86) PCT No.: PCT/EP2023/066371
§ 371 (c)(1),
(2) Date: Dec. 11, 2024

(87) PCT Pub. No.: WO2024/002738
PCT Pub. Date: Jan. 4, 2024

(65) Prior Publication Data

US 2025/0163345 A1 May 22, 2025

(30) Foreign Application Priority Data

Jun. 28, 2022 (EP) .................................... 22181475

(51) Int. Cl.

| | |
|---|---|
| ***C11D 1/83*** | (2006.01) |
| ***C11D 1/66*** | (2006.01) |
| ***C11D 3/00*** | (2006.01) |
| ***C11D 3/20*** | (2006.01) |
| ***C11D 3/37*** | (2006.01) |
| ***C11D 3/386*** | (2006.01) |

(52) U.S. Cl.
CPC ................ *C11D 1/662* (2013.01); *C11D 1/83* (2013.01); *C11D 3/0036* (2013.01); *C11D 3/2093* (2013.01); *C11D 3/3707* (2013.01); *C11D 3/38627* (2013.01); *C11D 2111/12* (2024.01)

(58) Field of Classification Search
CPC ......... C11D 1/662; C11D 1/83; C11D 3/0094; C11D 3/386; C11D 2111/12
See application file for complete search history.

(56) References Cited

U.S. PATENT DOCUMENTS

| | | | |
|---|---|---|---|
| 4,305,961 | A | 12/1981 | Tsutsumi et al. |
| 4,435,307 | A | 3/1984 | Barbesgaard et al. |
| 5,648,263 | A | 7/1997 | Schülein et al. |
| 5,691,178 | A | 11/1997 | Schülein et al. |
| 5,776,757 | A | 7/1998 | Schülein et al. |
| 6,472,364 | B1 | 10/2002 | Heltovics |
| 7,300,782 | B2 | 11/2007 | Breves et al. |
| 7,556,654 | B1 | 7/2009 | Nero |
| 8,911,982 | B2 | 12/2014 | Schaffer et al. |
| 9,005,928 | B2 | 4/2015 | Schaffer et al. |
| 9,068,211 | B2 | 6/2015 | Schaffer et al. |
| 9,085,787 | B2 | 7/2015 | Schaffer et al. |
| 9,102,968 | B2 | 8/2015 | Schaffer et al. |
| 9,157,108 | B2 | 10/2015 | Schaffer et al. |
| 9,243,212 | B2 | 1/2016 | Kuppert et al. |
| 9,271,908 | B2 | 3/2016 | Allef et al. |
| 9,351,485 | B2 | 5/2016 | Giessler-Blank et al. |
| 9,434,755 | B2 | 9/2016 | Schilling et al. |
| 9,580,720 | B2 | 2/2017 | Schaffer et al. |
| 10,174,353 | B2 | 1/2019 | Thum et al. |
| 10,292,924 | B2 | 5/2019 | Schilling et al. |
| 10,544,384 | B2 | 1/2020 | Scheuermann et al. |
| 10,604,722 | B2 | 3/2020 | Schilling et al. |
| 10,988,713 | B2 | 4/2021 | Schilling et al. |
| 11,254,896 | B2 | 2/2022 | Kuppert et al. |
| 11,464,717 | B2 | 10/2022 | Wenk et al. |
| 11,606,963 | B2 | 3/2023 | Schilling et al. |
| 11,685,905 | B2 | 6/2023 | Thum et al. |

(Continued)

FOREIGN PATENT DOCUMENTS

| | | |
|---|---|---|
| CN | 1141357 | 3/2004 |
| DE | 29 39 519 | 4/1980 |

(Continued)

OTHER PUBLICATIONS

Trummler et al, "An integrated microbial/enzymatic process for the production of rhamnolipids and L-(+}-rhamnose from rapeseed oil with *Pseudomonas* sp. DSM 2874", European Journal of Lipid Science and Technology, vol. 105, No. 10, Aug. 7, 2003 pp. 563-5741.*
European Search Report received for European Patent Application No. 22181475.9, mailed on Nov. 28, 2022, 8 pages.
International Search Report received for PCT Application No. PCT/EP2023/066371, mailed on Aug. 28, 2023, 6 pages.
Lei et al., "Enhanced rhamnolipids production in Pseudomonas aeruginosa SG by selectively blocking metabolic bypasses of glycosyl and fatty acid precursors", Biotechnol. Lett., vol. 42, Feb. 14, 2000, pp. 997-1002.
Trummler et al., "An integrated microbial/enzymatic process for the production of rhamnolipids and L-(+)-rhamnose from rapeseed oil with *Pseudomonas* sp. DSM 2874", European Journal of Lipid Science and Technology, vol. 105, No. 10, Aug. 7, 2003, pp. 563-571.

(Continued)

*Primary Examiner* — Charles I Boyer
(74) *Attorney, Agent, or Firm* — Grüneberg and Myers PLLC

(57) ABSTRACT

Compositions having at least one biosurfactant and at least one persicomycin. The at least one biosurfactant is selected from the group consisting of rhamnolipids, glucolipids and sophorolipids. The compositions optionally have at least one enzyme, at least one non-biosurfactant and/or at least one selected from the group consisting of an anti-redeposition polymer and a soil release polymer. The compositions clean surfaces of an article in a process for cleaning said article.

20 Claims, No Drawings

(56) References Cited

U.S. PATENT DOCUMENTS

| | | | | |
|---|---|---|---|---|
| 11,820,913 | B2 | 11/2023 | Reuter et al. | |
| 11,918,670 | B2 | 3/2024 | Brandt et al. | |
| 11,993,803 | B2 | 5/2024 | Brandt et al. | |
| 2004/0171512 | A1 | 9/2004 | Furuta et al. | |
| 2004/0259222 | A1 | 12/2004 | Breves et al. | |
| 2008/0213194 | A1 | 9/2008 | DeSanto | |
| 2009/0011970 | A1 | 1/2009 | Evers | |
| 2009/0170745 | A1 | 7/2009 | Merkel et al. | |
| 2009/0275493 | A1 | 11/2009 | Siegert et al. | |
| 2012/0220464 | A1 | 8/2012 | Giessler-Blank et al. | |
| 2013/0035403 | A1 | 2/2013 | Schaffer et al. | |
| 2013/0130319 | A1 | 5/2013 | Schaffer et al. | |
| 2014/0148588 | A1 | 5/2014 | Schilling et al. | |
| 2014/0296125 | A1 | 10/2014 | Kuppert et al. | |
| 2014/0296168 | A1 | 10/2014 | Schilling et al. | |
| 2014/0349902 | A1 | 11/2014 | Allef et al. | |
| 2015/0056658 | A1 | 2/2015 | Schaffer et al. | |
| 2015/0056659 | A1 | 2/2015 | Schaffer et al. | |
| 2015/0056660 | A1 | 2/2015 | Schaffer et al. | |
| 2015/0056661 | A1 | 2/2015 | Schaffer et al. | |
| 2015/0247151 | A1 | 9/2015 | Schaffer et al. | |
| 2016/0045424 | A1 | 2/2016 | Schwab et al. | |
| 2016/0249604 | A1 | 9/2016 | Giessler-Blank et al. | |
| 2017/0094968 | A1 | 4/2017 | Sieverding | |
| 2017/0096695 | A1 | 4/2017 | Thum et al. | |
| 2017/0306264 | A1 | 10/2017 | Peggau et al. | |
| 2017/0335238 | A1 | 11/2017 | Schilling et al. | |
| 2018/0016525 | A1 | 1/2018 | Scheuermann et al. | |
| 2018/0023040 | A1 | 1/2018 | Schilling et al. | |
| 2018/0066297 | A1* | 3/2018 | Haas | C12P 19/44 |
| 2019/0031977 | A1 | 1/2019 | Kuppert et al. | |
| 2019/0233856 | A1 | 8/2019 | Thum et al. | |
| 2019/0269158 | A1 | 9/2019 | Schilling et al. | |
| 2019/0271020 | A1 | 9/2019 | Thum et al. | |
| 2019/0307657 | A1 | 10/2019 | Wenk et al. | |
| 2021/0283036 | A1* | 9/2021 | Stevenson | A61K 8/602 |
| 2021/0337835 | A1 | 11/2021 | Schilling et al. | |
| 2021/0371773 | A1 | 12/2021 | Brandt et al. | |
| 2022/0064487 | A1* | 3/2022 | Schaefer | C08K 5/1545 |
| 2022/0183958 | A1 | 6/2022 | Kleinen et al. | |
| 2022/0186048 | A1 | 6/2022 | Reuter et al. | |
| 2022/0186075 | A1 | 6/2022 | Reuter et al. | |
| 2022/0233440 | A1* | 7/2022 | Dell'Acqua | A61K 8/068 |
| 2023/0121094 | A1 | 4/2023 | Brandt et al. | |
| 2023/0190615 | A1 | 6/2023 | Liebig et al. | |
| 2023/0265359 | A1 | 8/2023 | Trambitas et al. | |
| 2023/0399666 | A1* | 12/2023 | Awasthi | C12P 7/6409 |
| 2024/0002813 | A1 | 1/2024 | Thum et al. | |
| 2024/0254411 | A1* | 8/2024 | van Buskirk | C11D 3/43 |

FOREIGN PATENT DOCUMENTS

| | | | |
|---|---|---|---|
| DE | 41 27 908 | | 2/1993 |
| DE | 196 00 743 | | 7/1997 |
| DE | 196 48 439 | | 5/1998 |
| DE | 10 2012 201 360 | A1 | 8/2013 |
| EP | 0 282 942 | | 9/1988 |
| EP | 0 499 434 | | 8/1992 |
| EP | 1 382 668 | | 1/2004 |
| EP | 1 445 302 | | 8/2004 |
| EP | 1 705 241 | | 9/2006 |
| EP | 1 746 109 | | 1/2007 |
| EP | 1 411 111 | | 9/2008 |
| EP | 2 797 571 | | 7/2013 |
| EP | 2 786 742 | A1 | 10/2014 |
| EP | 2 786 743 | | 10/2014 |
| EP | 2 787 065 | | 10/2014 |
| EP | 3 218 461 | | 5/2016 |
| EP | 3 218 465 | | 5/2016 |
| EP | 3 061 442 | | 8/2016 |
| EP | 2 596 088 | | 9/2016 |
| EP | 3 489 338 | | 5/2019 |
| EP | 3 489 340 | | 5/2019 |
| EP | 4 015 583 | A1 | 6/2022 |
| EP | 4 234 664 | A1 | 8/2023 |
| FR | 2 740 779 | | 5/1997 |
| FR | 2 855 752 | | 12/2004 |
| GB | 1 243 784 | | 8/1971 |
| GB | 1 296 839 | | 11/1972 |
| JP | 60-183032 | | 9/1985 |
| JP | 1-304034 | | 12/1989 |
| JP | 2006-70231 | | 3/2006 |
| JP | 2006-83238 | | 3/2006 |
| JP | 2006-274233 | | 10/2006 |
| JP | 2007-181789 | | 7/2007 |
| JP | 2008-62179 | | 3/2008 |
| WO | 89/09259 | | 10/1989 |
| WO | 91/02792 | | 3/1991 |
| WO | 93/18140 | | 9/1993 |
| WO | 93/24618 | | 12/1993 |
| WO | 95/10602 | | 4/1995 |
| WO | 96/34946 | | 11/1996 |
| WO | 98/15257 | | 4/1998 |
| WO | 01/44452 | | 6/2001 |
| WO | 02/29024 | | 4/2002 |
| WO | 03/002700 | | 1/2003 |
| WO | 03/002711 | | 1/2003 |
| WO | 03/006146 | | 1/2003 |
| WO | 03/054177 | | 7/2003 |
| WO | 03/057246 | | 7/2003 |
| WO | 2004/074419 | | 9/2004 |
| WO | 2007/001262 | | 1/2007 |
| WO | 2007/079938 | | 7/2007 |
| WO | 2007/131656 | | 11/2007 |
| WO | 2008/007319 | | 1/2008 |
| WO | 2008/086916 | | 7/2008 |
| WO | 2009/092699 | | 7/2009 |
| WO | 2009/102854 | | 8/2009 |
| WO | 2013/098066 | | 7/2013 |
| WO | 2016/075178 | | 5/2016 |
| WO | 2016/075179 | | 5/2016 |
| WO | 2016/131801 | A1 | 8/2016 |
| WO | 2019/154970 | | 8/2019 |
| WO | 2022/128786 | | 6/2022 |
| WO | 2022/233700 | A1 | 11/2022 |
| WO | 2023/099346 | A1 | 6/2023 |
| WO | 2023/161179 | A1 | 8/2023 |
| WO | 2023/161182 | A1 | 8/2023 |
| WO | 2023/198511 | A1 | 10/2023 |

OTHER PUBLICATIONS

Written Opinion received for PCT Application No. PCT/EP2023/066371, mailed on Aug. 28, 2023, 7 pages.

U.S. Appl. No. 15/151,021, filed May 10, 2016, 2016/0249604, Giessler-Blank et al.

U.S. Appl. No. 15/311,217, filed Nov. 15, 2016, 2017/0094968, Ewald Sieverding.

U.S. Appl. No. 15/509,685, filed Mar. 8, 2017, 2017/0306264, Peggau et al.

U.S. Appl. No. 14/783,142, filed Oct. 8, 2015, 2016/0045424, Schwab et al.

U.S. Appl. No. 18/313,165, filed May 5, 2023, 2024/0002813, Thum et al.

U.S. Appl. No. 16/334,781, filed Mar. 20, 2019, 2019/0233856, Thum et al.

U.S. Appl. No. 17/369,275, filed Jul. 7, 2021, 2021/0337835, Schilling et al.

U.S. Appl. No. 17/436,104, filed Sep. 3, 2021, 2022/0183958, Kleinen et al.

U.S. Appl. No. 17/907,015, filed Sep. 22, 2022, 2023/0190615, Liebig et al.

U.S. Appl. No. 18/173,537, filed Feb. 23, 2023, 2023/0265359, Trambitas et al.

U.S. Appl. No. 17/547,575, filed Dec. 10, 2021, 2022/0186048, Reuter et al.

* cited by examiner

COMPOSITION COMPRISING BIOSURFACTANT AND PERSICOMYCIN (3-(3'HYDROXY)HYDROXY FATTY ACID)

TITLE OF THE INVENTION

CROSS-REFERENCE TO RELATED APPLICATIONS

This application is a National Stage entry under § 371 of International Application No. PCT/EP2023/066371, filed on Jun. 19, 2023, and which claims the benefit of priority to European Patent Application No. 22181475.9, filed on Jun. 28, 2022. The content of each of these applications is hereby incorporated by reference in its entirety.

BACKGROUND OF THE INVENTION

Field of the Invention

The invention relates to compositions comprising at least one biosurfactant and at least one persicomycin.

Description of Related Art

Persicomycins are 3-(3'-hydroxy)hydroxy fatty acids and represent a family among the phytobacterial toxins. They are associated with necrosis in peach trees, with 3-(3'-hydroxy-decanoyloxy)hexadecenoic acid being the most prominent persicomycin, see Eur J Biochem. 1996 Aug. 1; 239(3):702-9.

EP2797571 discloses compositions comprising water, at least one biosurfactant and at least one fatty acid, wherein the fraction of the sum of all surfactants in the composition is from 1 to 30% by weight, and that the fraction of fatty acid, based on the sum of fatty acid and surfactants, is from 0.1 to 20% by weight.

SUMMARY OF THE INVENTION

It is an object of the intent invention to provide compositions with outstanding cleaning capabilities, especially in household care applications.

DETAILED DESCRIPTION OF THE INVENTION

It was found that, surprisingly, compositions comprising at least one biosurfactant and at least one persicomycin have special properties well suited for cleaning applications.

The present invention therefore provides a composition comprising

A) at least one biosurfactant, and

B) at least one persicomycin.

The invention further provides a method of cleaning articles as described in more detail in the description herein.

One advantage of the present invention is that the compositions of the instant invention have a very good cleaning performance, especially in fatty stain removal from fabrics.

Another advantage of the present invention is that the compositions of the instant invention can be rinsed off from a surface, preferably from fibres, that had been cleaned, very easily.

A further advantage is that the compositions of the instant invention support enzyme stability in terms of storage.

One advantage of the present invention is that a pure biological detergent is provided with all ingredients being of biological origin by the composition of the instant invention.

Another advantage of the present invention is that detergents with less total surfactant load while maintaining cleaning capabilities are provided by the composition of the instant invention.

Another advantage of the present invention is that a detergent with increases performance, especially on fatty stains.

A further advantage is by the composition of the instant invention a high-performance detergent is provided, which uses less ingredients. Thereby, the formulation complexity is reduced greatly, resulting in a simpler production process.

Another advantage of the present invention is that the formula shows especially good emulsification and dispersing properties.

Another advantage of the present invention is that detergents using mild surfactants with low aqua toxicity are provided by the composition of the instant invention.

Another advantage of the present invention is that the compositions of the instant invention can be formulated as 100% biodegradable.

Another advantage is that the formulation shows excellent compatibility with all materials contained in washing machines with respect to corrosion.

Another advantage is that the formulation can be diluted very easily with water without the necessity of excessive stirring.

One advantage of the present invention is that the compositions according to the instant invention have a positive odour profile.

Another advantage of the present invention is that the compositions according to the instant invention have an improved colour stability. Colour change reactions could come from Maillard reaction, which is a chemical reaction between proteins or amino acids and sugars. Both reaction partners, proteins and sugars, are typically contained in small amounts in a fermentative produced biosurfactant like Rhamnolipids, Sophorolipids or Rubiwettin. These small concentrations are sufficient to have a colour change from light to dark.

A further advantage is that the compositions according to the instant invention have improved cleaning properties of surfaces.

Another advantage is that the compositions according to the instant invention has excellent foaming properties.

A further advantage is that the compositions according to the instant invention is their reduced irritation for human skin.

Another advantage is that the compositions according to the instant invention is their mildness and good physiological compatibility, in particular characterized by a high value in the red blood cell (RBC) test.

A further advantage is that the compositions according to the instant invention is their good skin feel during and after washing.

Another advantage is that the compositions according to the instant invention is that they leave behind a smooth and soft skin feel after washing.

Another advantage is that the compositions according to the instant invention is their outstanding microbial stability.

Another advantage is that the compositions according to the instant invention have an improved ability to dissolve oils and fats.

Another advantage is that that the composition according to the instant invention has a higher viscosity than the corresponding composition without persicomycin.

The present invention provides a composition comprising

A) at least one biosurfactant, and

B) at least one persicomycin, preferably 3-(3'-hydroxydecanoyloxy)hexadecenoic acid.

Within the context of the present invention, "biosurfactants" are understood as meaning all glycolipids produced by fermentation. The term "biosurfactant" also covers glycolipids that are chemically or enzymatically modified after fermentation, as long as structurally a glycolipid remains. Raw materials for producing the biosurfactants that can be used are carbohydrates, in particular sugars such as e.g. glucose and/or lipophilic carbon sources such as fats, oils, partial glycerides, fatty acids, fatty alcohols, long-chain saturated or unsaturated hydrocarbons.

In the context of the present invention, the terms "surfactant" is understood to mean organic substances having interface-active properties that have the ability to reduce the surface tension of water at 20° C. and at a concentration of 0.5% by weight based on the overall composition to below 45 mN/m. Surface tension is determined by the Du Nouy ring method at 20° C.

Within the context of the present invention "persicomycins" are understood as meaning 3-(3'-hydroxy)hydroxy fatty acids as well as the corresponding salts thereof.

Where average values are stated hereinbelow, then, unless stated otherwise, these are number-averaged average values.

Unless stated otherwise, percentages are data in percent by weight.

Wherever measurement values are stated hereinbelow, then, unless stated otherwise, these have been determined at a temperature of 25° C. and a pressure of 1013 mbar.

The composition according to the instant invention preferably comprises as component A) at least one biosurfactant selected from rhamnolipids, sophorolipids, glucolipids, cellulose lipids, mannosylerythritol lipids and trehalose lipids, preferably rhamnolipids, sophorolipids and glucolipids, most preferably rhamnolipids. The biosurfactants can be produced e.g. as in EP 0 499 434, U.S. Pat. No. 7,985,722, WO 03/006146, JP 60 183032, DE 19648439, DE 19600743, JP 01 304034, CN 1337439, JP 2006 274233, KR 2004033376, JP 2006 083238, JP 2006 070231, WO 03/002700, FR 2740779, DE 2939519, U.S. Pat. No. 7,556,654, FR 2855752, EP 1445302, JP 2008 062179 and JP 2007 181789 or the documents cited therein. Suitable biosurfactants can be acquired e.g. from Soliance, France.

Preferably, the composition according to the instant invention has, as biosurfactant at least one selected from rhamnolipids, in particular mono-, di- or polyrhamnolipids, glucolipids, in particular mono-, di- or polyglucolipids, and sophorolipids, in particular mono-, di- or polysophorolipids, preferably selected from rhamnolipids and glucolipids, most preferably rhamnolipids.

The term "rhamnolipids" in the context of the present invention preferably is understood to mean particularly compounds of the general formula (I) and salts thereof, Formula (I)

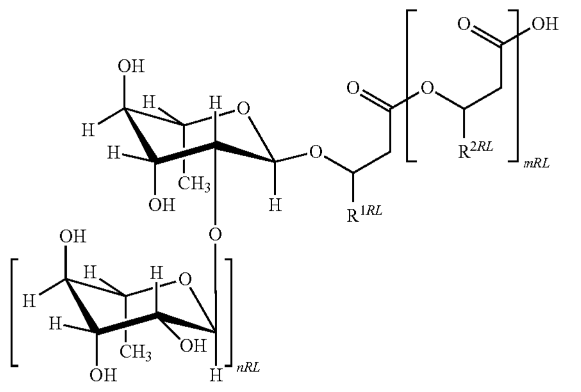

where mRL=2, 1 or 0, nRL=1 or 0, $R^{1RL}$ and $R^{2RL}$=mutually independently, identical or different, organic residues having 2 to 24, preferably 5 to 13 carbon atoms, in particular optionally branched, optionally substituted, particularly hydroxy-substituted, optionally unsaturated, in particular optionally mono-, bi- or triunsaturated alkyl residues, preferably those selected from the group consisting of pentenyl, heptenyl, nonenyl, undecenyl and tridecenyl and $(CH_2)_o$—$CH_3$ where o=1 to 23, preferably 4 to 12. If nRL=1, the glycosidic bond between the two rhamnose units is preferably in the α-configuration. The optically active carbon atoms of the fatty acids are preferably present as R-enantiomers (e.g. (R)-3-{(R)-3-[2-O-(α-L-rhamnopyranosyl)-α-L-rhamnopyranosyl] oxydecanoyl}oxydecanoate).

The term "di-rhamnolipid" in the context of the present invention is understood to mean compounds of the general formula (I) or salts thereof, where nRL=1.

The term "mono-rhamnolipid" in the context of the present invention is understood to mean compounds of the general formula (I) or salts thereof, where nRL=0.

Distinct rhamnolipids are abbreviated according to the following nomenclature:

"diRL-CXCY" are understood to mean di-rhamnolipids of the general formula (I), in which one of the residues $R^{1RL}$ and $R^{2RL}$=$(CH_2)_o$—$CH_3$ where o=X-4 and the remaining residue $R^{1RL}$ or $R^{2RL}$=$(CH_2)_o$—$CH_3$ where o=Y-4.

"monoRL-CXCY" are understood to mean mono-rhamnolipids of the general formula (I), in which one of the residues $R^{1RL}$ and $R^{2RL}$=$(CH_2)_o$—$CH_3$ where o=X-4 and the remaining residue $R^{1RL}$ or $R^{2RL}$=$(CH_2)_o$—$CH_3$ where o=Y-4.

The nomenclature used therefore does not distinguish between "CXCY" and "CYCX".

For rhamnolipids where mRL=0, monoRL-CX or diRL-CX is used accordingly.

If one of the abovementioned indices X and/or Y is provided with ":Z", this signifies that the respective residue $R^{1RL}$ and/or $R^{2RL}$ is equal to an unbranched, unsubstituted hydrocarbon residue having X-3 or Y-3 carbon atoms having Z double bonds.

Methods for preparing the relevant rhamnolipids are disclosed, for example, in EP2786743 and EP2787065.

Rhamnolipids applicable in the context of the instant invention can also be produced by fermentation of *Pseudomonas*, especially *Pseudomonas aeruginosa*, which are preferably non genetically modified cells, a technology already disclosed in the eighties, as documented e.g. in EP0282942 and DE4127908. Rhamnolipids produced in *Pseudomonas aeruginosa* cells which have been improved for higher rhamnolipid titres by genetical modification can also be used in the context of the instant invention; such cells have for example been disclosed by Lei et al. in Biotechnol Lett. 2020 June; 42(6):997-1002.

Rhamnolipids produced by *Pseudomonas aeruginosa* are commercially available from Jeneil Biotech Inc., e.g. under the tradename Zonix, from Logos Technologies (technology acquired by Stepan), e.g. under the tradename NatSurFact, from Biotensidion GmbH, e.g. under the tradename Rhapynal, from AGAE technologies, e.g. under the name R90, R95, R95Md, R95Dd, from Locus Bio-Energy Solutions and from Shanghai Yusheng Industry Co. Ltd., e.g. under the tradename Bio-201 Glycolipids.

The present invention provides a composition preferably comprising as biosurfactant rhamnolipids, characterized in that the biosurfactant component A) comprises 51% by weight to 100% by weight, preferably 60% by weight to 95% by weight, particularly preferably 80% by weight to 90% by weight, of mono-rhamnolipids, especially those of formula (I) with nRL=0, where the percentages by weight refer to the sum of all of the rhamnolipids present.

This surprisingly elevates the viscosity of the composition according to the instant invention. Preferably this preferred embodiment is combined with a content of soil release agents (see below), preferably of the carboxy methyl inulin type.

The present invention further provides a composition preferably comprising as biosurfactant rhamnolipids, characterized in that the biosurfactant component A) comprises 51% by weight to 95% by weight, preferably 55% by weight to 80% by weight, particularly preferably 60% by weight to 70% by weight, of diRL-C10C10, where the percentages by weight refer to the sum of all of the rhamnolipids present.

A preferred composition according to the invention is characterized in that the composition comprises as biosurfactant rhamnolipids as described above with a content of 0.5% by weight to 15% by weight, preferably 3% by weight to 12% by weight, particularly preferably 5% by weight to 10% by weight, of diRL-C10C12:1, where the percentages by weight refer to the sum of all of the rhamnolipids present.

A further preferred composition according to the invention is characterized in that the composition comprises as biosurfactant rhamnolipids as described above with a content of 0.5 to 25% by weight, preferably 3% by weight to 15% by weight, particularly preferably 5% by weight to 12% by weight, of diRL-C10C12, where the percentages by weight refer to the sum of all of the rhamnolipids present.

A further preferred composition according to the invention is characterized in that the composition comprises as biosurfactant rhamnolipids as described above with a content of 0.1% by weight to 25% by weight, preferably 2% by weight to 10% by weight, particularly preferably 4% by weight to 8% by weight, of diRL-C8C10, where the percentages by weight refer to the sum total of all rhamnolipids present.

An even further preferred composition according to the invention is characterized in that the composition comprises as biosurfactant rhamnolipids as described above with a content of 0.1% by weight to 5% by weight, preferably 0.5% by weight to 3% by weight, particularly preferably 0.5% by weight to 2% by weight, of monoRL-C8C10 and/or, preferably and 0.1% by weight to 5% by weight, preferably 0.5% by weight to 3% by weight, particularly preferably 0.5% by weight to 2% by weight, of monoRL-C10C10, where the percentages by weight refer to the sum of all of the rhamnolipids present.

The present invention provides a composition alternatively preferably comprising as biosurfactant rhamnolipids, characterized in that the biosurfactant component A) comprises 10% by weight to 50% by weight, preferably 20% by weight to 40% by weight, particularly preferably 25% by weight to 35% by weight, of monoRL-C10C10 and where the percentages by weight refer to the sum of all of the rhamnolipids present.

The alternatively preferred composition according to the invention is preferably characterized in that the composition comprises as biosurfactant rhamnolipids as described above with a content of 10% by weight to 30% by weight, preferably 12% by weight to 25% by weight, particularly preferably 15% by weight to 20% by weight, of diRL-C10C10, where the percentages by weight refer to the sum of all of the rhamnolipids present.

The alternatively preferred composition according to the invention is preferably characterized in that the composition comprises as biosurfactant rhamnolipids as described above with a content of 10% by weight to 30% by weight, preferably 12% by weight to 25% by weight, particularly preferably 15% by weight to 20% by weight, of monoRL-C8C10, where the percentages by weight refer to the sum of all of the rhamnolipids present.

The alternatively preferred composition according to the invention is preferably characterized in that the composition comprises as biosurfactant rhamnolipids as described above with a content of 3% by weight to 25% by weight, preferably 5% by weight to 20% by weight, particularly preferably 10% by weight to 15% by weight, of monoRL-C10C12:1, where the percentages by weight refer to the sum total of all rhamnolipids present.

The alternatively preferred composition according to the invention is preferably characterized in that the composition comprises as biosurfactant rhamnolipids as described above with a content of 1% by weight to 15% by weight, preferably 2% by weight to 10% by weight, particularly preferably 3% by weight to 8% by weight, of diRL-C10C12, where the percentages by weight refer to the sum of all of the rhamnolipids present.

Methods for preparing the relevant rhamnolipids are disclosed, for example, in EP2786743 and EP2787065.

Rhamnolipids applicable in the context of the instant invention can also be produced by fermentation of *Pseudomonas*, especially *Pseudomonas aeruginosa*, which are preferably non genetically modified cells, a technology already disclosed in the eighties, as documented e.g. in EP0282942 and DE4127908. Rhamnolipids produced in *Pseudomonas aeruginosa* cells which have been improved for higher rhamnolipid titres by genetical modification can also be used in the context of the instant invention; such cells have for example been disclosed by Lei et al. in Biotechnol Lett. 2020 June; 42(6):997-1002.

Rhamnolipids produced by *Pseudomonas aeruginosa* are commercially available from Jeneil Biotech Inc., e.g. under the tradename Zonix, from Logos Technologies (technology acquired by Stepan), e.g. under the tradename NatSurFact, from Biotensidion GmbH, e.g. under the tradename Rhapynal, from AGAE technologies, e.g. under the name R90, R95, R95Md, R95Dd, from Locus Bio-Energy Solutions and from Shanghai Yusheng Industry Co. Ltd., e.g. under the tradename Bio-201 Glycolipids.

In the context of the present invention, the term "sophorolipids" preferably is understood as meaning compounds of the general formulae (IIa) and (IIb) and salts thereof formula (IIa)

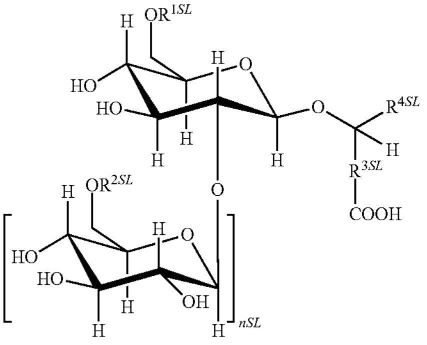

formula (IIb)

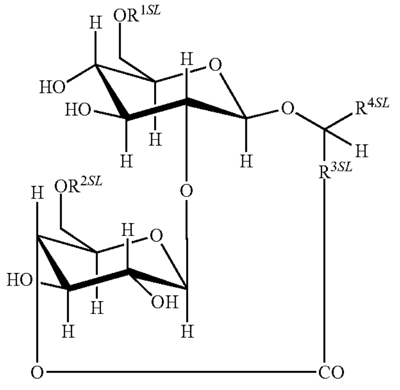

where $R^{1SL}$=H or CO—$CH_3$, $R^{2SL}$=H or CO—$CH_3$, $R^{3SL}$=a divalent organic moiety which comprises 6 to 32 carbon atoms and which is unsubstituted or substituted by hydroxyl functions, is unbranched and optionally comprises one to three double or triple bonds, $R4^{SL}$=H, $CH_3$ or a monovalent organic radical which comprises 2 to 10 carbon atoms and which is unsubstituted or substituted by hydroxyl functions, which is unbranched and which optionally comprises one to three double or triple bonds, and nSL=1 or 0.

Sophorolipids may be used in accordance with the invention in their acid form or their lactone form. Preferred compositions according to the instant invention comprise a sophorolipid in which the ratio by weight of lactone form to acid form is in the range of 20:80 to 80:20, especially preferably in the ranges of 30:70 to 40:60.

To determine the content of sophorolipids in the acid or lactone form in a formulation, refer to EP1411111B1, page 8, paragraph [0053].

In connection with the present invention, the term "glucolipids" preferably is understood as meaning compounds of the general formula (III) and salts thereof, formula (III)

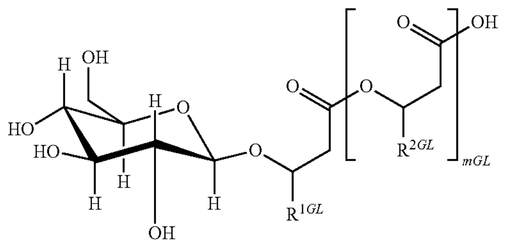

where mGL=3, 2, 1 or 0, preferably 1 or 0, $R^{1GL}$ and $R^{2GL}$=independently of one another identical or different organic radical having 2 to 24 carbon atoms, in particular optionally branched, optionally substituted, in particular hydroxy-substituted, optionally unsaturated, in particular optionally mono-, di- or tri-unsaturated, alkyl radical, preferably one selected from the group consisting of pentenyl, heptenyl, nonenyl, undecenyl and tridecenyl and $(CH_2)_o$—$CH_3$ where o=1 to 23, preferably 4 to 12.

Distinct glucolipids are abbreviated according to the following nomenclature:

"GL-CXCY" is understood as meaning glucolipids of the general formula (III) in which one of the radicals $R^{1GL}$ and $R^{2GL}$=$(CH_2)_o$—$CH_3$ where o=X-4 and the remaining radical $R^{1GL}$ or $R^{2GL}$=$(CH_2)_o$—$CH_3$ where o=Y-4.

The nomenclature used thus does not differentiate between "CXCY" and "CYCX".

If one of the aforementioned indices X and/or Y is provided with ":Z", then this means that the respective radical $R^{1GL}$ and/or $R^{2GL}$=an unbranched, unsubstituted hydrocarbon radical with X-3 or Y-3 carbon atoms having Z double bonds.

Methods for production of glucolipids can be carried out as described in WO2019154970.

A preferred composition according to the instant invention is characterized in that the ratio of component B) to component A) is in the range of 1:2000 to 1:3, preferably 1:1000 to 1:10, more preferably 1:300 to 1:20, most preferably 1:100 to 1:25.

When determining the content of component A) and B) in the context of the present invention, the mass of the non-salt form is taken into account; thus, the weight of the corresponding cation is disregarded.

A preferred composition according to the instant invention further comprises

C) at least one enzyme, preferably selected from the group consisting of protease, amylase, lipase, pectinase, cellulase, phosphodiesterase, mannanase, cutinase, pectate lyase, peroxidase, oxidase and laccase.

Enzymes are useful additives in laundry compositions. The enzymes preferably comprised in the composition according to the instant invention are selected from the group consisting of protease, amylase, lipase, pectinase, cellulase, phosphodiesterase, mannanase, cutinase, pectate lyase, peroxidase, oxidase and laccase with protease, amylase, lipase, pectinase, cellulase, phosphodiesterase and mannanase being especially preferred.

The enzymes to be used in the context of the present invention can, for example, originally originate from microorganisms, for example of the genera *Bacillus, Streptomyces, Humicola*, or *Pseudomonas*, and/or be produced by suitable microorganisms according to known biotechnological processes, for example by transgenic expression hosts, for example of the genera *Escherichia, Bacillus*, or filamentous fungi.

It is emphasized that it can in particular also be technical enzyme preparations of the respective enzyme, i.e. accompanying substances may be present. The enzymes can therefore be packaged and used together with accompanying substances, for example from fermentation or with other stabilizers.

Suitable proteases include those of bacterial, fungal, plant, viral or animal origin e.g. vegetable or microbial origin. Microbial origin is preferred. Chemically modified or protein engineered mutants are included. It may be an alkaline protease, such as a serine protease or a metalloprotease. A serine protease may for example be of the S1 family, such as trypsin, or the S8 family such as subtilisin. A metalloproteases protease may for example be a thermolysin from e.g. family M4 or other metalloprotease such as those from M5, M7 or M8 families.

Examples of proteases are the subtilisins BPN from *Bacillus amyloliquefaciens* and Carlsberg from *Bacillus licheniformis*, the protease PB92, the subtilisins 147 and 309, the protease from *Bacillus lentus*, subtilisin DY and the subtilases, but no longer assigned to the subtilisins in the narrower sense Thermitase, Proteinase K and the proteases TW3 and TW7.

Subtilisin Carlsberg is in a further developed form under the trade name Alcalase® from the Novozymes A/S, Bagsvasrd, Denmark.

The subtilisins 147 and 309 are sold by the Novozymes company under the trade names Esperase® and Savinase®, respectively. The protease variants under the name BLAP® are derived from the protease from *Bacillus lentus* DSM 5483. Further usable proteases are, for example, those under the trade names Durazym®, Relase®, Everlase®, Nafizym®, Natalase®, Kannase® and Ovozyme® from Novozymes, which are among trade names, Purafect®, Purafect® OxP, Purafect® Prime, Excellase® and Properase® from the company Danisco/Genencor, which operates under the trade name Protosol® from Company Advanced Biochemicals Ltd., Thane, India, which operates under the trade name Wuxi® from the company Wuxi Snyder Bioproducts Ltd., China, which operates under the trade name Proleather® and Protease P® from Amano Pharmaceuticals Ltd., Nagoya, Japan, and the enzyme available under the name Proteinase K-16 from Kao Corp., Tokyo, Japan.

The proteases from *Bacillus gibsonii* and *Bacillus pumilus*, which are disclosed in the international patent applications WO 08/086916 and WO 07/131656, are also particularly preferably used. Further advantageously usable proteases are disclosed in the patent applications WO 91/02792, WO 08/007319, WO 93/18140, WO 01/44452, GB 1243784, WO 96/34946, WO 02/029024 and WO 03/057246. Other proteases that can be used are those found in the microorganisms *Stenotrophomonas maltophilia*, in particular *Stenotrophomonas maltophilia* K279a, *Bacillus intermedius* and *Bacillus sphaericus* are naturally present.

Other commercially available proteases are: Liquanase® EC 3.5 L, Liquanase® Evity® EC 3.5 L, Liquanase® 3.5 L, Liquanase® Evity® 3.5 L, Preferenz P100, Preferenz P200, Preferenz P300, Biotouch ROC, BIOPROTEASA L 800 ST, Bioproteasa 800 P, Bioproteasa L 800, Lavergy® Pro 114 LS, Progress Uno EC 100 L, Progress Uno 100 L, Progress Uno 101 L, EFFECTENZ™ P 100 (A01339), EFFECTENZ™ P 150, Savinase® Evity® EC 16 L, Savinase® Evity® EC 24 T, Savinase® Evity® 16 L, Savinase® Evity® 24 T, Excellenz P 1250, Blaze® Evity® EC 150 T, Blaze® Evity® 150 T, Blaze® Evity® 125 T, Blaze Evity 16 L, Excellase, Purafect, Purafect OxP, Purafect Prime, Properase, Blaze® Pro EC 100 L, Blaze® Pro 100 L, Blaze Exceed 100 T, Progress Key 150 T, Progress Excel 101 L.

A protease preferably comprised in the composition according to the instant invention is Liquanase® 2.5 L.

Suitable amylases which can be used herein may be an alpha-amylase or a glucoamylase and may be of bacterial or fungal origin. Chemically modified or protein engineered mutants are included. Amylases include, for example, alpha-amylases obtained from *Bacillus*, e.g., a special strain of *Bacillus licheniformis*, described in more detail in GB 1,296,839.

Examples of amylases are the α-amylases from *Bacillus licheniformis*, from *Bacillus amyloliquefaciens* or from *Bacillus stearothermophilus* and, in particular, their improved further developments for use in detergents or cleaning agents.

The enzyme from *Bacillus licheniformis* is available from the Novozymes company under the name Termamyl® and from the Danisco/Genencor company under the name Purastar® ST.

Further development products of this α-amylase are available from Novozymes under the trade names Duramyl® and Termamyl® ultra, from Danisco/Genencor under the name Purastar® OxAm and from Daiwa Seiko Inc., Tokyo, Japan, as Keistase®.

The α-amylase from *Bacillus amyloliquefaciens* is sold by the Novozymes company under the name BAN®, and variants derived from the α-amylase from *Bacillus stearothermophilus* under the names BSG® and Novamyl®, also from the Novozymes company.

Furthermore, the α-amylase from *Bacillus* sp.

A 7-7 (DSM 12368) and the cyclodextrin glucanotransferase (CGTase) from *Bacillus agaradherens* (DSM 9948) should be emphasized.

The amylolytic enzymes disclosed in the international patent applications WO 03/002711, WO 03/054177 and WO07/079938 can also be used.

Fusion products of all the molecules mentioned can also be used. In addition, the further developments of the α-amylase from *Aspergillus niger* and *A. oryzae* available from the Novozymes company under the trade names Fungamyl® are suitable. Further commercial products that can be used advantageously are, for example, the Amylase-LT® and Stainzyme® or Stainzyme Ultra® or Stainzyme Plus®, the latter also from Novozymes. Variants of these enzymes obtainable by point mutations can also be used according to the invention.

Other commercially available amylases are: Amplify Prime EC 110 L, Amplify Prime 100 L, PREFERENZ S 110, Bioamyl P, Stainzyme Plus Evity, Stainzyme® Plus Evity® EC 12 T, Stainzyme® Plus Evity® EC 24 T, Stainzyme® Plus Evity® 24 T, EFFECTENZ™ S 100, EFFECTENZ™ S210, Bialfa T, Achieve Alpha EC 110 L, Achieve Alpha 100 L, Achieve® Advance 150 T, Stainzyme, Amplify, Duramyl, Novamyl, Amplify™ Prime 100 L is preferably comprised in the composition according to the instant invention Suitable cellulases include those of bacterial or fungal origin. Chemically modified or protein engineered mutants are included. Suitable cellulases include cellulases from the genera *Bacillus, Pseudomonas, Humicola, Fusarium, Thielavia, Acremonium*, e.g., the fungal cellulases produced from *Humicola insolens, Myceliophthora thermophila* and *Fusarium oxysporum* disclosed in U.S. Pat. Nos. 4,435,307, 5,648,263, 5,691,178, 5,776,757 and WO 89/09259.

Examples of cellulases (endoglucanases, EG) is the fungal, endoglucanase (EG)-rich cellulase preparation or its further developments, which is offered by the Novozymes company under the trade name Celluzyme®.

The products Endolase® and Carezyme®, also available from Novozymes, are based on the 50 kD-EG, or the 43 kD-EG from *Humicola insolens* DSM 1800. Other commercial products from this company that can be used are Cellusoft®, Renozyme® and Celluclean®. Cellulases, for example, which are available from the company AB Enzymes, Finland, under the trade names Ecostone® and Biotouch®, and which are at least partly based on the 20 kD EG from *Melanocarpus*, can also be used. Other cellulases from AB Enzymes are Econase® and Ecopulp®. Further suitable cellulases are from *Bacillus* sp. CBS 670.93 and CBS 669.93, the ones from *Bacillus* sp. CBS 670.93 from the company Danisco/Genencor is available under the trade name Puradax®. Other commercial products from Danisco/Genencor that can be used are "Genencor detergent cellulase L" and IndiAge® Neutra.

Other commercially available cellulases are: Carezyme® Premium EC 4510 L, Carezyme® Premium Evity® EC 5000 T, Carezyme® Premium 4500 L, Carezyme® Premium Evity® 5000 T, REVILATENZ 200, Biotouch DCL/FCL, Biosoft L Pure, Rocksoft, Retrocell, Retrocell ZircoN, Puradax EG 7000L, Biotouch FCC, BIOCELULASA MC L, BIOCELULASA MC P, Celluclean® EC 5000 L, Celluclean® 5000 L, REVILATENZ 200, Biotouch FLX, Lavergy® C Bright 100 L, Celluclean® Evity® EC 4500 T, Celluclean® Evity® 4500 T, Biotouch DCC, Further preferred enzymes present in the composition of the instant invention are those known under the term glycosidases (E.C. 3.2.1.X). These include in particular arabinases, fucosidases, Galactosidases, galactanases, arabicogalactan-galactosidases, mannanases (also referred to as mannosidases or mannases), glucuronosidases, agarase, carrageenases, pullulanases, β-glucosidases, xyloglucanases (xylanases), xanthanases and pectin-degrading enzymes. Preferred glycosidases are also summarized under the term hemicellulases. Hemicellulases include in particular mannanases, xyloglucanases (xylanases), β-glucosidases and carrageenases and also pectinases, pullulanases and β-glucanases. Pectinases are pectin-degrading enzymes, the hydrolytic pectin-degrading enzymes in particular belonging to the enzyme classes EC 3.1.1.1 1, EC 3.2.1.15, EC 3.2.1.67 and EC 3.2.1.82. In the context of the present invention, the pectinases also include enzymes with the designations pectin lyase, pectin esterase, pectin demethoxylase, pectin methoxylase, pectin methylesterase, pectase, pectin methylesterase, pectinoesterase, pectin-galle-lactase, pectin-galgalase, pectin-gal-galase, pectin-gal-galase, pectin-galgalase, pectin-gal-galase, pectin-gal-galase, pectin-galgalonase, pectin-galactolase, endopoly-nolase, pectin-polygalase, pectin-polyhydrolase, pectin-poly-galase, pectin-polyhydrolase, pectin-poly-galase, pectin-poly-galase-a-1, 4-galacturonide glycanohydrolase, endogalacturonase, endo-D-galacturonase, galacturan 1, 4-a-galacturonidase, exopolygalacturonase, poly (galacturonate) hydrolase, exo-D-galacturonase, exo-D-galacturonanase-Galacturonase, exo-poly-a-galacturonosidase, Exopolygalacturonosidase or exopolygalacturanosidase.

Examples of enzymes suitable in this regard are, for example, under the names Gamanase®, Pektinex AR® or Pectaway® from Novozymes, under the name Rohapec® B1 L from AB Enzymes and under the name Pyrolase® from Diversa Corp., San Diego, CA, USA.

The β-glucanase obtained from *Bacillus subtilis* is available under the name Cereflo® from the Novozymes company.

Glycosidases or hemicellulases which are particularly preferred according to the invention are mannanases, which for example, under the trade name Mannaway® by the Novozymes company or Purabrite® by the Danisco/Genencor company.

Examples of commercially available mannanases are: Mannaway® EC 200 L, Mannaway® EC 108 L, Mannaway® 200 L, Mannaway® 100 L, PREFERENZ M100, Biotouch M, Biomananasa 2XL. A mannanase preferably comprised in the composition according to the instant invention is Mannaway® 4.0 L.

Examples of commercially available pectate lyases are: Xpect® EC 1000 L, Xpect® EC 1000 T, Xpect® 1000 L, Xpect® 1000 T, PREVERENZ F 1000, Pectex Pure, Lavergy® Pro 106 L, Lavergy® Pro 106 LS.

Examples of commercially available licheninases are: Lift INTENT 100 L, Lift INTENT 100 T.

Suitable lipases and cutinases include those of bacterial or fungal origin. Chemically modified or protein engineered mutant enzymes are included. Examples of lipases or cutinases are those originally from *Humicola lanuginose* (*Thermomyces lanuginosus*) obtainable or further developed therefrom, in particular those with the amino acid substitution D96L. They are sold, for example, by the company Novozymes under the trade names Lipolase®, Lipolase® Ultra, LipoPrime®, Lipozyme® and Lipex®.

Another lipase which can be used advantageously is available from the Novozymes company under the trade name Lipoclean®.

Furthermore, for example, the cutinases that were originally isolated from *Fusarium solanipisi* and *Humicola insolens* can be used. Lipases that can also be used are available from Amano under the names Lipase CE®, Lipase P®, Lipase B®, or Lipase CES®, Lipase AKG®, *Bacillis* sp. Lipase®, Lipase AP®, Lipase M-AP® and Lipase AML® available. For example, the lipases or cutinases from the Danisco/Genencor company can be used whose starting enzymes were originally isolated from *Pseudomonas mendocina* and *Fusarium solanii*. Other important commercial products are the preparations M1 Lipase® and Lipomax® originally sold by the company Gist-Brocades (now Danisco/Genencor) and those from the company Meito Sangyo KK, Japan, under the name Lipase MY-30®, Lipase OF® and Lipase PL®, as well as the product Lumafast® from Danisco/Genencor.

Other example of commercially available lipases are: Lipex® Evity® EC 100 L, Lipex® Evity® EC 100 T, Lipex® Evity® EC 200 L, Lipex® Evity® 100 L, Lipex® Evity® 100 T, Lipex® Evity® 200 L, PREFERENZ L 100, Biolipasa 2XL, Biolipasa L, Biolipasa P, Lipoclean, Lipolase, Lipolase Ultra. A lipase preferably comprised in the composition according to the instant invention is Lipex™ 100 L Evity.

Examples of commercially available Phosphodiesterase are: Pristine from Novozyme Suitable peroxidases/oxidases include those of plant, bacterial or fungal origin. Chemically modified or protein engineered mutants are included. Examples of useful peroxidases include peroxidases from *Coprinus*, e.g., from *C. cinereus*, and variants thereof as those described in WO 93/24618, WO 95/10602, and WO 98/15257.

Commercially available peroxidases include Guardzyme™ (Novozymes A/S).

A preferred composition according to the instant invention is characterized in that it comprises the sum of A) and B) in an amount of from 2.0 wt.-% to 60 wt.-%, preferably from 5.0 wt.-% to 40 wt.-%, more preferably from 10.0 wt.-% to 30 wt.-%, as may be the case C) in an amount of from 0.2 wt.-% to 10 wt.-%, preferably from 1.0 wt.-% to 8.0 wt.-%, more preferably from 1.5 wt.-% to 6.0 wt.-%, where the percentages by weight refer to the total composition.

A preferred composition according to the instant invention is characterized in that it comprises at least one non-biosurfactant, preferably selected from the group of anionic, cationic, non-ionic, semi-polar, amphoteric and zwitterionic surfactants.

Preferably the non-biosurfactant is selected from the group of fatty alcohol alkoxylates. These can be advantageously used for cleaning a surface of a textile or a fabric containing polyamines.

Non-limiting examples of anionic surfactants include sulfates and sulfonates, in particular, linear alkylbenzenesulfonates (LAS), isomers of LAS, branched alkylbenzenesulfonates (BABS), phenylalkanesulfonates, alpha-olefinsulfonates (AOS), olefin sulfonates, alkene sulfonates, alkane-2,3-diylbis(sulfates), hydroxyalkanesulfonates and disulfonates, alkyl sulfates (AS) such as sodium dodecyl sulfate (SDS), fatty alcohol sulfates (FAS), primary alcohol sulfates (PAS), alcohol ethersulfates (AES or AEOS or FES, also known as alcohol ethoxysulfates or fatty alcohol ether sulfates), secondary alkanesulfonates (SAS), paraffin sulfonates (PS), ester sulfonates, sulfonated fatty acid glycerol esters, alpha-sulfo fatty acid methyl esters (alpha-SFMe or SES) including methyl ester sulfonate (MES), alkyl- or alkenylsuccinic acid, dodecenyl/tetradecenyl succinic acid (DTSA), fatty acid derivatives of amino acids, diesters and monoesters of sulfo-succinic acid or soap, and combinations thereof.

Non-limiting examples of cationic surfactants include alklydimethylethanolamine quat (ADMEAQ), cetyltrimethylammonium bromide (CTAB), dimethyldistearylammonium chloride (DSDMAC), and alkylbenzyldimethylammonium, alkyl quaternary ammonium compounds, alkoxylated quaternary ammonium (AQA) compounds, and combinations thereof.

Non-limiting examples of non-ionic surfactants include alcohol ethoxylates (AE or AEO), which are preferably comprised in the composition according to the instant invention, alcohol propoxylates, propoxylated fatty alcohols (PFA), alkoxylated fatty acid alkyl esters, such as ethoxylated and/or propoxylated fatty acid alkyl esters, alkylphenol ethoxylates (APE), nonylphenol ethoxylates (NPE), alkylpolyglycosides (APG), alkoxylated amines, fatty acid monoethanolamides (FAM), fatty acid diethanolamides (FADA), ethoxylated fatty acid monoethanolamides (EFAM), polyglycerol esters, glycerol esters, propoxylated fatty acid monoethanolamides (PFAM), polyhydroxy alkyl fatty acid amides, or N-acyl N-alkyl derivatives of glucosamine (glucamides, GA, or fatty acid glucamide, FAGA), as well as products available under the trade names SPAN and TWEEN, and combinations thereof.

Non-limiting examples of semipolar surfactants include amine oxides (AO) such as alkyldimethylamineoxide, N-(coco alkyl)-N,N-dimethylamine oxide and N-(tallow-alkyl)-N,N-bis(2-hydroxyethyl)amine oxide, fatty acid alkanolamides and ethoxylated fatty acid alkanolamides, and combinations thereof.

Non-limiting examples of amphoteric and zwitterionic surfactants include betaine, alkyldimethylbetaine, sulfobetaine, hydroxysultaine and combinations thereof.

Furthermore, bio-based surfactants can be included in the composition according to the instant invention, which are not based on glycolipids, for example lipopeptides like surfactins or phospholipids like lecithins.

The composition according to the instant invention can further comprise one or more auxiliary agents selected from the group consisting of bleaching systems, hydrotropes, polymers, which may be synthetic, biopolymers, anti-redeposition aids, fiber protection agents, soil release agents, dye transfer inhibitors, fabric hueing agents, opacifiers, blueing dyes, enzyme stabilizing agents, solvents, viscosity modifiers, preservatives, pH-regulators and salts like NaCl and $Na_2SO_4$.

Any polymer known in the art for use in detergents may be utilized. The polymer may function as a co-builder as mentioned above, or may provide antiredeposition, fiber protection, soil release, dye transfer inhibition, viscosity modifiers, grease cleaning and/or anti-foaming properties. Exemplary polymers include (carboxymethyl)cellulose (CMC), poly(vinyl alcohol) (PVA), poly(vinylpyrrolidone) (PVP), poly(ethyleneglycol) or poly(ethylene oxide) (PEG), ethoxylated poly(ethyleneimine), carboxymethyl inulin (CMI), and polycarboxylates such as PAA, PAA/PMA, poly-aspartic acid, and lauryl methacrylate/acrylic acid copolymers, hydrophobically modified CMC (HM-CMC) and silicones, copolymers of terephthalic acid and oligomeric glycols, copolymers of poly(ethylene terephthalate) and poly(oxyethene terephthalate) (PET-POET), PVP, poly (vinylimidazole) (PVI), poly(vinylpyridine-N-oxide) (PVPO or PVPNO) and polyvinylpyrrolidone-vinylimidazole (PVPVI). Further exemplary polymers include sulfonated polycarboxylates, polyethylene oxide and polypropylene oxide (PEO-PPO) and diquaternium ethoxy sulfate. Other exemplary polymers are disclosed in, e.g., WO 2006/130575. Salts of the above-mentioned polymers are also contemplated.

Preferably a composition according to the instant invention is characterized in that it comprises at least one selected from anti-redeposition polymers and soil release polymers, with soil release polymers being preferred. This has the technical effect, that the cleaning capabilities of the composition according to the instant invention is even more enhanced. In combination with glycolipids, which bear one sugar ring in the molecule, e.g. like mono-rhamnolipids and glucolipids of formula (III) a surprising viscosity increase can be observed.

It is preferred in the context of the instant invention, that the anti-redeposition polymer or soil release polymer is selected from the group comprising, preferably consisting of, modified cellulose, preferably carboxymethylcellulose, cellulose acetate and methylcellulose, modified starch, modified inulin, preferably carboxy methyl inulin, polyitaconic acid, polyvinylpyrrolidone, polyvinyl alcohol, and polyethylene glycol, with carboxymethylcellulose and methylcellulose being most preferred.

Further preferred soil release polymers are water soluble polyesters as for example from the TexCare® range commercially available under the name TexCare SRN 260, TexCare SRN 170, TexCare SRN 170 Terra, TexCare SRN 260 SG Terra, TexCare SRN 260 Life and combinations thereof, as well, as the soil release polymers disclosed in EP3218461, EP3218465, EP3489340 and EP3489338.

Further preferred soil release polymers are selected from carboxy methyl inulins. A commercial example is Carboxyline® CMI.

This type of soil release polymer is especially useful in boosting the viscosity build-up, induced by a content of glycolipids, which bear one sugar ring in the molecule, e.g. like mono-rhamnolipids and glucolipids of formula (III).

EP1746109 discloses hybrid polymers of amylose and acrylates, that can also advantageously used in the composition of the instant invention as soil release polymers. A commercial example for this type of soil release polymers is Alcoguard® H 5941.

Non-limiting examples of biopolymers including: starch, like e.g. corn starch, *Zea mays* starch and tapioca starch, modified starch, like e.g. starch hydroxypropyltrimonium chloride and hydrolyzed corn starch, cellulose, bacterial cellulose, modified cellulose, like e.g. microcrystalline cellulose, hydroxypropyl methylcellulose and cetyl hydroxyethylcellulose, guar gum, pectin, inulin, carrageenan, alginate, galactoarabinan, polycitronellol, carboxymethyl inulin, carboxymethyl cellulose, polyitaconic acid and combinations and salts thereof.

Suitable non-aqueous solvents include monohydric or polyhydric alcohols, alkanolamines or glycol ethers, provided they are miscible with water in the specified concentration range.

The solvents are preferably selected from ethanol, n-propanol, i-propanol, butanols, glycol, propanediol, butanediol, glycerine, diglycol, propyldiglycol, butyldiglycol, hexylene glycol, ethylene glycol methyl ether, ethylene glycol ethyl ether, ethylene glycol propyl ether, n-butyl glycol ether, ethylene glycol mono-glycol ether, Diethylene glycol ethyl ether, propylene glycol methyl ether, propylene glycol ethyl ether, Propylene glycol propyl ether, dipropylene glycol monomethyl ether, dipropylene glycol monoethyl ether, diisopropylene glycol monomethyl ether, diisopropylene glycol monoethyl ether, methoxy triglycol, ethoxy triglycol, butoxy triglycol, 1-butoxyethoxy-2-propanol, n-butoxyethoxy-2-propanol, di-butoxyethoxy-2-propanol, 3-butyl-3-methoxyether solvents, and mixtures of these solvents, butoxyethoxy-2-propanol, 3-butyl-3-butyl ether, propyl glycol, di-octanol ether, di-butoxy-2-propanol, 3-butyl-3-butylether, propanol, propylenglycol, di-butoxyethoxy-2-propanol, di-butoxyethoxy-2-propanol, 3-butoxy-3-methoxyether solvents, diisopropylene glycol monomethylether, diisopropylene glycol monomethylether, and mixtures of these solvents. However, it is preferred that the surfactant preparation contains a polyol as the non-aqueous solvent. The polyol can comprise glycerol, 1,2-propanediol, 1,3-propanediol, ethylene glycol, diethylene glycol and/or dipropylene glycol.

Any preservative known in the art for use in detergents may be utilized. Exemplary preservatives include phenoxyethanol, sodium levulinate, sodium benzoate, p-anisic acid, potassium sorbate, benzoic acid, glyceryl caprylate, capryl glycol, penthylene glycol, methyl propane diol, bronopol, isothiazolinone (methylisothiazolinone, chloromethylisothiazolinone) and combinations thereof Preferably the composition according to the instant invention comprises one or more encapsulate comprising a benefit agent, preferably a sensorial benefit agent. Preferred encapsulates in this context comprise shear/pressure-sensitive action encapsulates, whereby the sensorial benefit agent is released in response to mechanical force (e.g., friction, pressure, shear stress) on the encapsulate. The encapsulate shell is preferably comprised of materials including but not limited to polyurethane, polyamide, polyolefin, polysaccharide, protein, silicone, lipid, modified cellulose, gums, polyacrylate, polyphosphate, polystyrene, polyesters or combinations of these materials. Preferably the sensorial benefit agent comprises a skin benefit agent or an olfactory benefit agent and/or may be a volatile benefit agent. Sensorial benefit agents may also have benefits for hair and/or hard surfaces and/or fabrics. The sensorial benefit may have anti-foam properties, and as such it is advantageous for foaming purposes that it is encapsulated so as not interfering with the foam until release by rubbing. Suitable volatile benefit agents include but are not limited to perfumes, insect repellents, essential oils, sensates such as menthol and aromatherapy actives, preferably perfumes. Mixtures of volatile benefit agents may be used. The total amount of benefit agent is preferably from 0.01 to 10% by weight, more preferably from 0.05 to 5% by weight, even more preferably from 0.1 to 4.0%, most preferably from 0.15 to 4.0% by weight, based on the total weight of the composition. The preferred benefit agent is a perfume. The composition of the instant invention may also comprise an unconfined (also called non-encapsulated) volatile benefit agent. Where the volatile benefit agent is a perfume, the perfumes described below are suitable for use as the encapsulated volatile benefit agent and also as the unconfined perfume component.

Preferably the composition according to the instant invention has a viscosity in the range of from 5 to 400, preferably of from 10 to 350, preferably of from 15 to 300, mPas (measured: Brookfield LV, s61, 200 rpm, 20° C.).

Preferably the composition according to the instant invention has a turbidity of from 0.005 to 5000, preferably of from 11.0 to 100, Nephelometric Turbidity Units. The measurement of turbidity is conducted with a 2100Q Portable Turbidimeter which measures the intensity of light scattered at 90 degrees as a beam of light passes through a liquid sample, giving a direct response in NTU. The NTU is a unit measuring the lack of clarity of liquids and is used by water and sewage treatment plants, in marine studies, for example. For example, water containing 1 milligram of finely divided silica per liter has a turbidity of 1 NTU. The water to be measured is placed in a standard container. A light beam passes through the water and strikes a sensor on the other side of the container. A second sensor is mounted at right angles to the beam, measuring light scattered by particles in the water. From the ratio between the light intensities at the two sensors the turbidity in NTU can be calculated.

The composition as contemplated herein preferably is a detergent composition. It may be in any convenient form, e.g., a bar, a homogenous tablet, a tablet having two or more layers, a pouch having one or more compartments, a regular or compact powder, a granule, a paste, a gel, or a regular, compact or concentrated liquid. There are a number of detergent formulation forms such as layers (same or different phases), pouches, as well as forms for machine dosing unit. Pouches can be configured as single or multicompartment. It can be of any form, shape and material which is suitable for hold the composition, e.g. without allowing the release of the composition from the pouch prior to water contact. The pouch is made from water soluble film which encloses an inner volume. Said inner volume can be divided into compartments of the pouch. Preferred films are polymeric materials preferably polymers which are formed into a film or sheet. Preferred polymers, copolymers or derivates thereof are selected polyacrylates, and water-soluble acrylate copolymers, methyl cellulose, carboxy methyl cellulose, sodium dextrin, ethyl cellulose, hydroxyethyl cellulose, hydroxypropyl methyl cellulose, malto dextrin, poly methacrylates, most preferably polyvinyl alcohol copolymers and, hydroxypropyl methyl cellulose (HPMC). Preferably the level of polymer in the film for example PVA is at least about 60%. Preferred average molecular weight will typically be from about 20,000 to about 150,000. Films can also be of blend compositions comprising hydrolytically degradable and water-soluble polymer blends such as polyactide and polyvinyl alcohol (known under the Trade reference M8630 as sold by Chris Craft In. Prod. Of Gary, Ind., US) plus plasticizers like glycerol, ethylene glycerol, Propylene glycol, sorbitol and mixtures thereof. The pouches can comprise a solid laundry detergent composition or part components and/or a liquid cleaning composition or part components separated by the water-soluble film. The compartment for liquid components can be different in composition than compartments containing solids, see for example US20090011970.

Detergent ingredients can be separated physically from each other by compartments in water dissolvable pouches or in different layers of tablets. Thereby negative storage interaction between components can be avoided. Different dissolution profiles of each of the compartments can also give rise to delayed dissolution of selected components in the wash solution.

The detergent composition according to the instant invention can be in form of a laundry soap bar and used for hand washing laundry, fabrics and/or textiles. The term laundry soap bar includes laundry bars, soap bars, combo bars, syndet bars and detergent bars. The types of bar usually differ in the type of surfactant they contain, and the term laundry soap bar includes those containing soaps from fatty acids and/or synthetic soaps. The laundry soap bar has a physical form which is solid and not a liquid, gel or a powder at room temperature. The term solid is defined as a physical form which does not significantly change over time, i.e. if a solid object (e.g. laundry soap bar) is placed inside a container, the solid object does not change to fill the container it is placed in. The bar is a solid typically in bar form but can be in other solid shapes such as round or oval.

The detergent composition according to the instant invention can be formulated as a granular detergent as described in WO09/092699, EP1705241, EP1382668, WO07/001262, U.S. Pat. No. 6,472,364, WO04/074419 or WO09/102854.

The detergent composition according to the instant invention preferably is in the form of a liquid or gel detergent. This may be aqueous, typically containing at least 20% by weight water, with the percentages referring to the total composition. Other types of liquids, including without limitation, alkanols, amines, diols, ethers and polyols may be included in an aqueous liquid or gel. An aqueous liquid or gel detergent composition may contain from 0-30 wt.-% organic solvent, with the percentages referring to the total composition. A liquid or gel detergent may be non-aqueous.

A preferred composition according to the invention is characterized in that the pH of the composition at 25° C. is from 3.0 to 10.0, preferably from 4.0 to 9.5 and particularly preferably from 7.0 to 9.0.

The "pH" in connection with the present invention—unless stated otherwise—is defined as the value which is measured for the relevant composition at 25° C. after stirring for five minutes using a pH electrode calibrated in accordance with ISO 4316 (1977).

The instant invention further provides a process for cleaning a surface of an article, preferably a textile or a fabric, comprising the steps of a) providing a composition according to the invention and an article,
b) combining the provided composition and the provided article with water,
c) maintaining the temperature of the water comprising the provided composition and the provided article in a temperature range of from 15° C. to 100° C., preferably from 25° C. to 65° C., more preferably from 35° C. to 45° C., over a period of time of from 5 minutes to 240 minutes, preferably from 10 minutes to 180 minutes, more preferably from 20 minutes to 120 minutes, while tentatively moving the provided article in the water,
d) separating the article from the water, and optionally
e) rinsing the article with further water.

A preferred process according to the instant invention is characterized in that the weight ratio of the provided article and water in step b) and c) are in the range of from 1:2 to 1:30, preferably from 1:3 to 1:25, more preferably from 1:4 to 1:20.

A preferred process according to the instant invention is characterized in that in step b) per kg of water 0.1 g to 50 g, preferably 1.0 g to 20 g, more preferably 2.0 g to 10 g, composition according to the instant invention are provided.

The instant invention further provides the use of a composition according to the instant invention for cleaning a surface of an article, preferably a textile or a fabric.

Preferably the use according to the instant invention is characterized in that the surface of the article is cleaned from fat and/or oil, preferably from solid fatty stains.

The examples adduced hereinafter describe the present invention by way of example, without any intention that the invention and the scope of application of which is apparent from the entirety of the description, be restricted to the embodiments specified in the examples.

EXAMPLES

Rhamnolipids used were prepared as described in example 1 of EP3061442 and resemble di-rhamnolipids; mono-rhamnolipids were prepared as in example 2 of EP3061442.

The sophorolipid used is a sophorolipid REWOFERM SL ONE from Evonik, which has a lactone to acid ratio of 40:60.

Glucolipids were produced according to example 2 of WO2019154970 via fermentation

Example 1

The following formulations were prepared with the numbers given being weight percentages of active matter, Benchmark 1 and Benchmark 2 (commercially available detergents) as well as Benchmark 3, Benchmark 4 and Benchmark 5 (internal available detergents) being not according to the invention, Detergent 1-6 according to the invention:

TABLE 1

| Ingredient | Detergent 1.0 | Detergent 2.0 | Detergent 3.0 |
|---|---|---|---|
| Na soap from palm kernel oil | 2 | 2 | 2 |
| Sodium Citrate | 6 | 6 | 6 |
| di-rhamnolipids | 15 | — | — |
| mono-rhamnolipids | — | 15 | — |
| glucolipids | — | — | 15 |
| persicomycin | 1 | 1 | 1 |
| Dissolvine ® GLDA | 1 | 1 | 1 |
| Phenoxyethanol | 0.45 | 0.45 | 0.45 |
| NaOH (water solution) | 1 | 1 | 1 |
| Medley ® Brilliant 300 L | 2 | 2 | 2 |
| | Add water to 100% | Add water to 100% | Add water to 100% |
| pH | 8.0 | 8.2 | 8.1 |
| Viscosity (mPas) | 50 | 150 | 30 |
| Appearance | clear | clear | clear |

TABLE 2

| Ingredient | Detergent 1.1 | Detergent 2.1 | Detergent 3.1 |
|---|---|---|---|
| Na soap from palm kernel oil | 2 | 2 | 2 |
| Sodium Citrate | 6 | 6 | 6 |
| di-rhamnolipids | 15 | — | — |
| mono-rhamnolipids | — | 15 | — |
| glucolipids | — | — | 15 |
| persicomycin | 2.5 | 2.5 | 2.5 |
| Dissolvine ® GLDA | 1 | 1 | 1 |
| Phenoxyethanol | 0.45 | 0.45 | 0.45 |
| NaOH (water solution) | 1 | 1 | 1 |
| Medley ® Brilliant 300 L | 2 | 2 | 2 |
| | Add water to 100% | Add water to 100% | Add water to 100% |
| pH | 8.0 | 8.2 | 8.1 |
| Viscosity (mPas) | 50 | 180 | 80 |
| Appearance | clear | clear | clear |

TABLE 3

| Ingredient | Detergent 1.2 | Detergent 2.2 | Detergent 3.2 |
|---|---|---|---|
| Na soap from palm kernel oil | 2 | 2 | 2 |
| Sodium Citrate | 6 | 6 | 6 |
| di-rhamnolipids | 15 | — | — |
| mono-rhamnolipids | — | 15 | — |
| glucolipids | — | — | 15 |
| persicomycin | 5 | 5 | 5 |
| Dissolvine ® GLDA | 1 | 1 | 1 |
| Phenoxyethanol | 0.45 | 0.45 | 0.45 |
| NaOH (water solution) | 1 | 1 | 1 |
| Medley ® Brilliant 300 L | 2 | 2 | 2 |
| | Add water to 100% | Add water to 100% | Add water to 100% |
| pH | 8.0 | 8.2 | 8.1 |
| Viscosity (mPas) | 100 | 250 | 120 |
| Appearance | clear | clear | Turbid, performance not measurement |

TABLE 4

| Ingredient | Detergent 4.1 | Detergent 4.2 | Detergent 5 |
|---|---|---|---|
| Na soap from palm kernel oil | 2 | 2 | 2 |
| Sodium Citrate | 6 | 6 | 6 |
| di-rhamnolipids | 15 | 15 | 7.5 |
| mono-rhamnolipids | — | — | 7.5 |
| glucolipids | — | — | — |
| persicomycin | 0.3 | 0.1 | 5 |
| Dissolvine ® GLDA | 1 | 1 | 1 |
| Phenoxyethanol | 0.45 | 0.45 | 0.45 |
| NaOH (water solution) | 1 | 1 | 1 |
| Medley ® Brilliant 300 L | 2 | 2 | 2 |
| | Add water to 100% | Add water to 100% | Add water to 100% |
| pH | 8.1 | 8.0 | 8.2 |
| Viscosity (mPas) | 30 | 25 | 100 |
| Appearance | clear | clear | clear |

TABLE 4B

| Ingredient | Detergent 6 |
|---|---|
| Na soap from palm kernel oil | 2 |
| Sodium Citrate | 6 |
| di-rhamnolipids | 15 |
| mono-rhamnolipids | — |
| glucolipids | — |
| Na Soap from persicomycin | 5 |
| Dissolvine ® GLDA | 1 |
| Phenoxyethanol | 0.45 |
| NaOH (water solution) | 1 |
| Medley ® Brilliant 300 L | 2 |
| | Add water to 100% |
| pH | 8.0 |
| Viscosity (mPas) | 100 |
| Appearance | clear |

Benchmark 1 (Commercial Product)

| | |
|---|---|
| Texapon N70 | 4.2% |
| Dehydol LT7 | 12.3% |
| Glyceryl Cocoate Peg 30 | 8.4 |
| Potassium Oleate | 8.0% |
| Polyquarternium PQ 6 | 0.5% |
| Sodium citrate | 8.0% |
| Lactic Acid | 3.0% |
| Perfume | 0.5% |
| Ethanol (denatured, 96%) | 8.5% |
| Glycerin | 6.0% |
| Liquanase, 2.5 L | 0.5% |
| Stainzyme Plus 12 L | 0.2% |
| Celluclean 4500 L | 0.2% |
| | Add water to 100% |
| pH | 7.95 |

Benchmark 2 (Commercial Product)

| | |
|---|---|
| LAS | 35.4% |
| SLES 2EO | 7.1% |
| FAEO C12-18. 7 EO | 10.0% |
| Coco fatty acid | 2.0% |
| Texcare SRN 170 | 1.4% |
| Methoxy PPG Methacroylcholine | 0.5% |
| Citric acid | 3.0% |
| Sodium citrate | 2.0% |
| HEDP (60% solution) | 3.3% |
| Perfume | 1.0% |
| Sorbitol (solution) | 2.9% |
| Glycerin | 2.0% |
| MPG | 11.0% |
| Monoethanolamine | 9.0% |
| Liquanase 3.5 L | 1.0% |

-continued

| | |
|---|---|
| Amplify Prime 100 L | 0.7% |
| Lipex 100 L Evity | 0.4% |
| Mannaway 4.0 L | 0.2% |
| Xpect 1000 L | 0.2% |
| Celluclean 4500 L | 0.2% |
| Carezyme Premium 5000 L | 0.1% |
| | Add water to 100% |
| pH | 8.5 |

TABLE 5

| Ingredient | Benchmark 3 | Benchmark 4 | Benchmark 5 |
|---|---|---|---|
| Na soap from palm kernel oil | 2 | 2 | 2 |
| Sodium Citrate | 6 | 6 | 6 |
| di-rhamnolipids | 15 | — | — |
| mono-rhamnolipids | — | 15 | — |
| glucolipids | — | — | 15 |
| Dissolvine ® GLDA | 1 | 1 | 1 |
| Phenoxyethanol | 0.45 | 0.45 | 0.45 |
| NaOH (water solution) | 1.6 | 1.6 | 1.6 |
| Medley ® Brilliant 300 L | 2 | 2 | 2 |
| | Add water to 100% | Add water to 100% | Add water to 100% |
| pH | 8.0 | 8.3 | 8.2 |
| Viscosity (mPas) | 15 | 160 | 30 |
| Appearance | clear | clear | clear |

For the evaluation of the compositions in table 1 and 2, a stain removal test using the Linitest device, has been carried out.

A Linitest device was used for the test

TABLE 6

| Test conditions for the Linitest | |
|---|---|
| Washing liquor | 200 ml |
| Steel balls | 10 |
| Washing time/temperature | 20 min at 30° C. and 40° C. |
| Dosage detergent | 5 g/L |
| Washing cycles | 1 |
| Water hardness | 16 dH (1.17 $gMgCl_2*6H_2O$; 3.39 g $CaCl_2*2H_2O$; 0.44 $NaHCO_3$ in 10 L) |
| Soiled swatches | 3 × each stain |
| pH | pH was measured to be 7.6 but is used "as is |
| Rinse time | 3 × 30 seconds with tab water (ca. 5° dH) |

TABLE 7

| Stains used for the testing the washing performance. | | |
|---|---|---|
| Stains | Stain classes (Consumer denomination/ chemical nature) | |
| Beef fat | Grease, oil/Greasy - Enzymatic | C-S-61 |
| Beef fat/Lard | Grease, oil/Greasy - Enzymatic | C-S-63s |
| Grass | General soil/Bleachable - Enzymatic | C-S-07 |
| Blood | General Soil/Enzymatic | C-S 01 |
| Chocolate milk with carbon black | Food/Bleachable-Enzymatic | C03 |
| Blood/Milk/Ink | Food/ Bleachable -Enzymatic | C05 |

The used stains were purchased form CFT (Vlaardingen, Nederland's) which was also recommended by A.I.S.E (Laundry Detergent Testing Guidelines)

After the washing, the fabrics were rinsed and then dried in the air.

The evaluation of the degree of stain removal was carried out measuring the reflectance via spectrophotometer, using the Y-value of the Y, x, y color coordinates measurement, light source D65 with a UV cut-off filter at 420 nm. Aperture used for real stains 15 mm (minimum 12 mm). Stains were measured unfolded, 3 measurements per stain (in the center of the circular area, or closest homogenous area) so 18 times per stain. Measurements were taken on each stain before wash (to verify quality of stains) and after the wash and to evaluate standard deviations and are reported.

Results are expressed as the mean of value Y between three replicates and its standard deviation (σ) and shown in table 8 to 14. The better the soil removal, the larger the Y value.

TABLE 8

| Y value | | | | |
|---|---|---|---|---|
| ➤ 2 | Consumer relevant difference concerning stain removal | | | |
| | Benchmark 1 | | Benchmark 2 | |
| Stains | Y-value | σ | Y-value | σ |
| Beef fat | 42.1 | 1.96 | 44.3 | 1.93 |
| Beef fat/Lard | 53 | 2.01 | 54.2 | 2.22 |
| Grass | 77.8 | 0.97 | 81.5 | 0.41 |
| Blood | 41.6 | 1.35 | 53.1 | 3.08 |
| Chocolate milk with carbon Black | 64.6 | 1.55 | 69.11 | 0.20 |
| Blood/Milk/Ink | 34.8 | 1.54 | 43 | 1.68 |

TABLE 9

| | Benchmark 3 | | Benchmark 4 | | Benchmark 5 | |
|---|---|---|---|---|---|---|
| Stains | Y-value | σ | Y-value | σ | Y-value | σ |
| Beef fat | 41.6 | σ | 51.3 | 1.36 | 36.9 | 1.87 |
| Beef fat/Lard | 49.6 | 1.02 | 60.4 | 1.35 | 47.1 | 3.06 |
| Grass | 82.4 | 1.23 | 83.4 | 0.54 | 77.1 | 1.38 |
| Blood | 42.7 | 1.69 | 44.0 | 2.43 | 43.9 | 1.52 |
| Chocolate milk with carbon Black | 66.6 | 3.43 | 69.1 | 1.08 | 63.1 | 1.24 |
| Blood/Milk/Ink | 37.6 | 2.38 | 41.1 | 1.78 | 36.7 | 2.06 |

TABLE 10

| | Detergent 1.0 | | Detergent 2.0 | | Detergent 3.0 | |
|---|---|---|---|---|---|---|
| Stains | Y-value | σ | Y-value | σ | Y-value | σ |
| Beef fat | 39.3 | 1.71 | 54.8 | 0.9 | 41.3 | 0.5 |
| Beef fat/Lard | 50.3 | 1.14 | 55.4 | 0.76 | 52.7 | 0.9 |
| Grass | 77.7 | 0.60 | 79.8 | 0.75 | 78.05 | 1.05 |
| Blood | 42.3 | 1.49 | 44.6 | 1.87 | 42.4 | 1.78 |
| Chocolate milk with carbon Black | 67.5 | 1.86 | 67.2 | 1.13 | 67.0 | 2.00 |
| Blood/Milk/Ink | 34.5 | 1.68 | 38.7 | 2.27 | 46.7 | 1.50 |

TABLE 11

| | Detergent 1.1 | | Detergent 2.1 | | Detergent 3.1 | |
|---|---|---|---|---|---|---|
| Stains | Y-value | σ | Y-value | σ | Y-value | σ |
| Beef fat | 36.8 | 2.39 | 56.3 | 0.96 | 45.2 | 3.39 |
| Beef fat/Lard | 48.6 | 1.24 | 55.9 | 1.29 | 51.5 | 2.33 |

TABLE 11-continued

| | Detergent 1.1 | | Detergent 2.1 | | Detergent 3.1 | |
|---|---|---|---|---|---|---|
| Stains | Y-value | σ | Y-value | σ | Y-value | σ |
| Grass | 78.2 | 0.93 | 80.0 | 0.61 | 78.6 | 1.37 |
| Blood | 41.6 | 2.05 | 43.3 | 1.95 | 44.2 | 1.54 |
| Chocolate milk with carbon Black | 65.8 | 2.04 | 65.6 | 2.13 | 67.2 | 1.46 |
| Blood/Milk/Ink | 36.7 | 1.81 | 38.4 | 2.72 | 38.1 | 2.28 |

TABLE 12

| | Detergent 1.2 | | Detergent 3.2 | |
|---|---|---|---|---|
| Stains | Y-value | σ | Y-value | σ |
| Beef fat | 53.6 | 1.71 | 55.5 | 0.94 |
| Beef fat/Lard | 53.3 | 1.74 | 55.7 | 1.33 |
| Grass | 77.6 | 0.69 | 79 | 1.37 |
| Blood | 41.7 | 1.29 | 42.3 | 1.15 |
| Chocolate milk with carbon Black | 66.6 | 1.0.2 | 66.8 | 1.46 |
| Blood/Milk/Ink | 37.7 | 2.15 | 37.2 | 1.5 |

TABLE 13

| | Detergent 4.1 | | Detergent 4.1 | | Detergent 5 | |
|---|---|---|---|---|---|---|
| Stains | Y-value | σ | Y-value | σ | Y-value | σ |
| Beef fat | 43.0 | 0.39 | 41.3 | 0.44 | 49.3 | 0.72 |
| Beef fat/Lard | 49.8 | 0.80 | 48.9 | 3.2 | 50.2 | 0.69 |
| Grass | 69.3 | 1.25 | 69.5 | 1.34 | 79.4 | 1.44 |
| Blood | 41.4 | 2.13 | 41.0 | 1.57 | 41.2 | 1.27 |
| Chocolate milk with carbon Black | 67.2 | 4.1 | 66.2 | 1.99 | 66.7 | 1.55 |
| Blood/Milk/Ink | 39.6 | 0.99 | 39.4 | 0.60 | 34.0 | 0.83 |

TABLE 14

| | Detergent 6 | |
|---|---|---|
| Stains | Y-value | σ |
| Beef fat | 55.5 | 1.17 |
| Beef fat/Lard | 55.7 | 2.82 |
| Grass | 47.4 | 1.15 |
| Blood | 45.0 | 1.25 |
| Chocolate milk with carbon Black | 68.9 | 1.05 |
| Blood/Milk/Ink | 38.7 | 7.18 |

Results Evaluation:

It was surprisingly found that the addition of the component persicomycin to the biosurfactant-based detergent formulation will lead to a better cleaning performance with regards to stain removal. Especially in the case of fatty stains the combination outperformed both the formulations without persicomycin (Benchmarks 3, 4 and 5) and commercially available formulations (Benchmarks 1 and 2). Moreover, the addition of persicomycin is leading to a higher overall formulation viscosity that would very much fit with market and consumer expectations for liquid laundry detergents.

Further Detergent Examples

TABLE 15

| Ingredient | Detergent 10 | Detergent 11 | Detergent 12 |
|---|---|---|---|
| Na soap from palm kernel oil | 2 | 2 | 2 |
| Sodium Citrate | 6 | 6 | 6 |
| di-rhamnolipids | 15 | — | — |
| mono-rhamnolipids | — | 15 | — |
| glucolipids | — | — | 15 |
| persicomycin | 0.2 | 0.2 | 0.2 |
| Dissolvine ® GLDA | 1 | 1 | 1 |
| Phenoxyethanol | 0.45 | 0.45 | 0.45 |
| NaOH (water solution) | 1 | 1 | 1 |
| Medley ® Brilliant 300 L | 2 | 2 | 2 |
| | Add water to 100% | Add water to 100% | Add water to 100% |
| pH | 8.0 | 8.2 | 8.1 |

TABLE 16

| Ingredient | Detergent 13 | Detergent 14 | Detergent 15 |
|---|---|---|---|
| Na soap from palm kernel oil | 2 | 2 | 2 |
| Sodium Citrate | 6 | 6 | 6 |
| di-rhamnolipids | 15 | — | — |
| mono-rhamnolipids | — | 15 | — |
| glucolipids | — | — | 15 |
| persicomycin | 0.05 | 0.1 | 0.1 |
| Dissolvine ® GLDA | 1 | 1 | 1 |
| Phenoxyethanol | 0.45 | 0.45 | 0.45 |
| NaOH (water solution) | 1 | 1 | 1 |
| Medley ® Brilliant 300 L | 2 | 2 | 2 |
| | Add water to 100% | Add water to 100% | Add water to 100% |
| pH | 8.0 | 8.2 | 8.1 |

TABLE 17

| Ingredient | Detergent 16 | Detergent 17 |
|---|---|---|
| Na soap from palm kernel oil | 2 | 2 |
| Sodium Citrate | 6 | 6 |
| di-rhamnolipids | 7.5 | 5 |
| mono-rhamnolipids | 7.5 | 5 |
| glucolipids | — | 5 |
| persicomycin | 0.3 | 2.5 |
| Dissolvine ® GLDA | 1 | 1 |
| Phenoxyethanol | 0.45 | 0.45 |
| NaOH (water solution) | 1 | 1 |
| Medley ® Brilliant 300 L | 2 | 2 |
| | Add water to 100% | Add water to 100% |
| pH | 8.0 | 8.2 |

TABLE 18

| Ingredient | Detergent 18 | Detergent 19 | Detergent 20 |
|---|---|---|---|
| Na soap from palm kernel oil | 2 | 2 | 2 |
| Sodium Citrate | 6 | 6 | 6 |
| di-rhamnolipids | 15 | — | — |
| mono-rhamnolipids | — | 15 | — |
| glucolipids | — | — | 15 |
| persicomycin | 2.5 | 2.5 | 2.5 |
| Dissolvine ® GLDA | 1 | 1 | 1 |
| TexCare SNR 170 Terra | 1 | 1 | 1 |
| Phenoxyethanol | 0.45 | 0.45 | 0.45 |
| NaOH (water solution) | 1 | 1 | 1 |

TABLE 18-continued

| Ingredient | Detergent 18 | Detergent 19 | Detergent 20 |
|---|---|---|---|
| Medley ® Brilliant 300 L | 2 | 2 | 2 |
| | Add water to 100% | Add water to 100% | Add water to 100% |
| pH | 8.0 | 8.2 | 8.1 |

TABLE 19

| Ingredient | Detergent 21 | Detergent 22 | Detergent 23 |
|---|---|---|---|
| Na soap from palm kernel oil | 2 | 2 | 2 |
| Sodium Citrate | 6 | 6 | 6 |
| di-rhamnolipids | 15 | — | — |
| mono-rhamnolipids | — | 15 | — |
| glucolipids | — | — | 15 |
| persicomycin | 2.5 | 2.5 | 2.5 |
| Dissolvine ® GLDA | 1 | 1 | 1 |
| TexCare 260 SG Terra | 1 | 1 | 1 |
| Phenoxyethanol | 0.45 | 0.45 | 0.45 |
| NaOH (water solution) | 1 | 1 | 1 |
| Medley ® Brilliant 300 L | 2 | 2 | 2 |
| | Add water to 100% | Add water to 100% | Add water to 100% |
| pH | 8.0 | 8.2 | 8.1 |

TABLE 20

| Ingredient | Detergent 24 | Detergent 25 | Detergent 26 |
|---|---|---|---|
| Na soap from palm kernel oil | 2 | 2 | 2 |
| Sodium Citrate | 6 | 6 | 6 |
| di-rhamnolipids | 15 | — | — |
| mono-rhamnolipids | — | 15 | — |
| glucolipids | — | — | 15 |
| persicomycin | 2.5 | 2.5 | 2.5 |
| Dissolvine ® GLDA | 1 | 1 | 1 |
| Carboxyline CMI | 1 | 1 | 1 |
| Phenoxyethanol | 0.45 | 0.45 | 0.45 |
| NaOH (water solution) | 1 | 1 | 1 |
| Medley ® Brilliant 300 L | 2 | 2 | 2 |
| | Add water to 100% | Add water to 100% | Add water to 100% |
| pH | 8.0 | 8.2 | 8.1 |

TABLE 21

| Ingredient | Detergent 27 | Detergent 28 | Detergent 29 |
|---|---|---|---|
| Na soap from palm kernel oil | 2 | 2 | 2 |
| Sodium Citrate | 6 | 6 | 6 |
| di-rhamnolipids | 10 | — | — |
| mono-rhamnolipids | — | 10 | — |
| glucolipids | — | — | 10 |
| persicomycin | 2.5 | 2.5 | 2.5 |
| SLES 2EO | 5 | 5 | 5 |
| Dissolvine ® GLDA | 1 | 1 | 1 |
| Phenoxyethanol | 0.45 | 0.45 | 0.45 |
| NaOH (water solution) | 1 | 1 | 1 |
| Medley ® Brilliant 300 L | 2 | 2 | 2 |
| | Add water to 100% | Add water to 100% | Add water to 100% |
| pH | 8.0 | 8.2 | 8.1 |

TABLE 22

| Ingredient | Detergent 30 | Detergent 31 | Detergent 32 |
|---|---|---|---|
| Na soap from palm kernel oil | 2 | 2 | 2 |
| Sodium Citrate | 6 | 6 | 6 |
| di-rhamnolipids | 10 | — | — |

TABLE 22-continued

| Ingredient | Detergent 30 | Detergent 31 | Detergent 32 |
|---|---|---|---|
| mono-rhamnolipids | — | 10 | — |
| glucolipids | — | — | 10 |
| persicomycin | 2.5 | 2.5 | 2.5 |
| SLES 2EO | 5 | 5 | 5 |
| FAEO C12-18, 7 EO | 5 | 5 | 5 |
| Dissolvine ® GLDA | 1 | 1 | 1 |
| Phenoxyethanol | 0.45 | 0.45 | 0.45 |
| NaOH (water solution) | 1 | 1 | 1 |
| Medley ® Brilliant 300 L | 2 | 2 | 2 |
| | Add water to 100% | Add water to 100% | Add water to 100% |
| pH | 8.0 | 8.2 | 8.1 |

TABLE 23

| Ingredient | Detergent 33 | Detergent 34 | Detergent 35 |
|---|---|---|---|
| Na soap from palm kernel oil | 2 | 2 | 2 |
| Sodium Citrate | 6 | 6 | 6 |
| di-rhamnolipids | 10 | — | — |
| mono-rhamnolipids | — | 10 | — |
| glucolipids | — | — | 10 |
| persicomycin | 2.5 | 2.5 | 2.5 |
| FAEO C12-18, 7 EO | 5 | 5 | 5 |
| Dissolvine ® GLDA | 1 | 1 | 1 |
| Phenoxyethanol | 0.45 | 0.45 | 0.45 |
| NaOH (water solution) | 1 | 1 | 1 |
| Medley ® Brilliant 300 L | 2 | 2 | 2 |
| | Add water to 100% | Add water to 100% | Add water to 100% |
| pH | 8.0 | 8.2 | 8.1 |

TABLE 24

| Ingredient | Detergent 36 | Detergent 37 | Detergent 38 |
|---|---|---|---|
| Na soap from palm kernel oil | 2 | 2 | 2 |
| Sodium Citrate | 6 | 6 | 6 |
| di-rhamnolipids | 10 | — | — |
| mono-rhamnolipids | — | 10 | — |
| glucolipids | — | — | 10 |
| persicomycin | 2.5 | 2.5 | 2.5 |
| SLES 2EO | 5 | 5 | 5 |
| FAEO C12-18, 7 EO | 5 | 5 | 5 |
| Carboxyline CMI | 1 | 1 | 1 |
| Dissolvine ® GLDA | 1 | 1 | 1 |
| Phenoxyethanol | 0.45 | 0.45 | 0.45 |
| NaOH (water solution) | 1 | 1 | 1 |
| Medley ® Brilliant 300 L | 2 | 2 | 2 |
| | Add water to 100% | Add water to 100% | Add water to 100% |
| pH | 8.0 | 8.2 | 8.1 |

TABLE 25

| Ingredient | Detergent 39 | Detergent 40 | Detergent 41 |
|---|---|---|---|
| Na soap from palm kernel oil | 2 | 2 | 2 |
| Sodium Citrate | 6 | 6 | 6 |
| di-rhamnolipids | 10 | — | — |
| mono-rhamnolipids | — | 10 | — |
| glucolipids | — | — | 10 |
| persicomycin | 2.5 | 2.5 | 2.5 |
| SLES 2EO | 5 | 5 | 5 |
| FAEO C12-18, 7 EO | 5 | 5 | 5 |
| TexCare 260 SG Terra | 1 | 1 | 1 |
| Dissolvine ® GLDA | 1 | 1 | 1 |
| Phenoxyethanol | 0.45 | 0.45 | 0.45 |

TABLE 25-continued

| Ingredient | Detergent 39 | Detergent 40 | Detergent 41 |
|---|---|---|---|
| NaOH (water solution) | 1 | 1 | 1 |
| Medley ® Brilliant 300 L | 2 | 2 | 2 |
| | Add water to 100% | Add water to 100% | Add water to 100% |
| pH | 8.0 | 8.2 | 8.1 |

TABLE 26

| Ingredient | Detergent 42 | Detergent 44 | Detergent 45 |
|---|---|---|---|
| Na soap from palm kernel oil | 2 | 2 | 2 |
| Sodium Citrate | 6 | 6 | 6 |
| di-rhamnolipids | 20 | — | — |
| mono-rhamnolipids | — | 20 | — |
| glucolipids | — | — | 20 |
| persicomycin | 1 | 1 | 1 |
| Dissolvine ® GLDA | 1 | 1 | 1 |
| Phenoxyethanol | 0.45 | 0.45 | 0.45 |
| NaOH (water solution) | 1 | 1 | 1 |
| Medley ® Brilliant 300 L | 2 | 2 | 2 |
| | Add water to 100% | Add water to 100% | Add water to 100% |
| pH | 8.1 | 8.3 | 8.3 |
| Viscosity (mPas) | | | |
| Appearance | clear | clear | clear |

TABLE 27

| Ingredient | Detergent 46 | Detergent 47 | Detergent 48 |
|---|---|---|---|
| Na soap from palm kernel oil | 2 | 2 | 2 |
| Sodium Citrate | 6 | 6 | 6 |
| di-rhamnolipids | 15 | — | — |
| mono-rhamnolipids | — | 15 | — |
| glucolipids | — | — | 15 |
| persicomycin | 1 | 1 | 1 |
| sophorolipids | 2.5 | 2.5 | 2.5 |
| Dissolvine ® GLDA | 1 | 1 | 1 |
| Phenoxyethanol | 0.45 | 0.45 | 0.45 |
| NaOH (water solution) | 1 | 1 | 1 |
| Medley ® Brilliant 300 L | 2 | 2 | 2 |
| | Add water to 100% | Add water to 100% | Add water to 100% |
| pH | 8.0 | 8.0 | 8.0 |
| Viscosity (mPas) | | | |
| Appearance | clear | clear | clear |

TABLE 28

| Ingredient | Detergent 49 | Detergent 50 | Detergent 51 |
|---|---|---|---|
| Na soap from palm kernel oil | 2 | 2 | 2 |
| Sodium Citrate | 6 | 6 | 6 |
| di-rhamnolipids | 15 | — | — |
| mono-rhamnolipids | — | 15 | — |
| glucolipids | — | — | 15 |
| persicomycin | 2.5 | 2.5 | 2.5 |
| Dissolvine ® GLDA | 1 | 1 | 1 |
| sophorolipids | 2.5 | 2.5 | 2.5 |
| Carboxyline CMI | 1 | 1 | 1 |
| Phenoxyethanol | 0.45 | 0.45 | 0.45 |
| NaOH (water solution) | 1 | 1 | 1 |
| Medley ® Brilliant 300 L | 2 | 2 | 2 |
| | Add water to 100% | Add water to 100% | Add water to 100% |
| pH | 8.0 | 8.2 | 8.1 |

| Ingredients | Detergent 52 | Detergent 53 | Detergent 54 |
|---|---|---|---|
| MEA soap from palm kernel oil | 2 | 2 | 2 |
| Sodium Citrate | 6 | 6 | 6 |
| di-rhamnolipids | 10 | — | — |
| mono-rhamnolipids | — | 10 | — |
| glucolipids | — | — | 10 |
| persicomycin | 0.1 | 0.1 | 0.1 |
| SLES | 5 | 5 | 5 |
| FAEO C12-18, 4 EO | 3 | 3 | 3 |
| Trilon ® M | 1 | 1 | 1 |
| Phenoxyethanol | 0.45 | 0.45 | 0.45 |
| Monoethanol amine | 1.1 | 1.1 | 1.1 |
| Medley ® Brilliant 300 L | 2 | 2 | 2 |
| | Add water to 100% | Add water to 100% | Add water to 100% |
| pH | 8.0 | 8.2 | 8.1 |
| MEA soap from palm kernel oil | 2 | 2 | 2 |
| Sodium Citrate | 6 | 6 | 6 |
| di-rhamnolipids | 10 | — | — |
| mono-rhamnolipids | — | 10 | — |
| glucolipids | — | — | 10 |
| persicomycin | 0.1 | 0.1 | 0.1 |
| SLES | 5 | 5 | 5 |
| Myristic acid | 3 | 3 | 3 |
| Trilon ® M | 1 | 1 | 1 |
| Phenoxyethanol | 0.45 | 0.45 | 0.45 |
| Monoethanol amine | 1.1 | 1.1 | 1.1 |
| Medley ® Brilliant 300 L | 2 | 2 | 2 |
| | Add water to 100% | Add water to 100% | Add water to 100% |
| pH | 8.0 | 8.2 | 8.1 |

| Ingredients | Detergent 55 | Detergent 56 | Detergent 57 |
|---|---|---|---|
| MEA soap from palm kernel oil | 2 | 2 | 2 |
| Sodium Citrate | 6 | 6 | 6 |
| di-rhamnolipids | 10 | — | — |
| mono-rhamnolipids | — | 10 | — |
| glucolipids | — | — | 10 |
| persicomycin | 0.1 | 0.1 | 0.1 |
| SLES | 5 | 5 | 5 |
| Glucopon 600 | 5 | 5 | 5 |
| Trilon ® M | 1 | 1 | 1 |
| Phenoxyethanol | 0.45 | 0.45 | 0.45 |
| Monoethanol amine | 1.1 | 1.1 | 1.1 |
| Medley ® Brilliant 300 L | 2 | 2 | 2 |
| | Add water to 100% | Add water to 100% | Add water to 100% |
| pH | 8.0 | 8.2 | 8.1 |

| Ingredients | Detergent 58 | Detergent 59 | Detergent 60 |
|---|---|---|---|
| MEA soap from palm kernel oil | 2 | 2 | 2 |
| Sodium Citrate | 6 | 6 | 6 |
| di-rhamnolipids | 10 | — | — |
| mono-rhamnolipids | — | 10 | — |
| glucolipids | — | — | 10 |
| persicomycin | 0.1 | 0.1 | 0.1 |
| Glucopon 600 | 5 | 5 | 5 |
| Trilon ® M | 1 | 1 | 1 |
| Phenoxyethanol | 0.45 | 0.45 | 0.45 |
| Monoethanol amine | 1.1 | 1.1 | 1.1 |
| Medley ® Brilliant 300 L | 2 | 2 | 2 |
| | Add water to 100% | Add water to 100% | Add water to 100% |
| pH | 8.0 | 8.2 | 8.1 |

| Ingredients | Detergent 61 | Detergent 62 | Detergent 63 |
|---|---|---|---|
| MEA soap from palm kernel oil | 2 | 2 | 2 |
| MEA Citrate | 6 | 6 | 6 |
| di-rhamnolipids | 10 | — | — |
| mono-rhamnolipids | — | 10 | — |
| glucolipids | — | — | 10 |
| persicomycin | 0.1 | 0.1 | 0.1 |
| Glucopon 600 | 5 | 5 | 5 |
| Trilon ® M | 1 | 1 | 1 |
| Phenoxyethanol | 0.45 | 0.45 | 0.45 |
| Monoethanol amine | 1.1 | 1.1 | 1.1 |
| Medley ® Brilliant 300 L | 2 | 2 | 2 |
| | Add water to 100% | Add water to 100% | Add water to 100% |
| pH | 8.0 | 8.2 | 8.1 |

| Ingredients | Detergent 64 | Detergent 65 | Detergent 66 |
|---|---|---|---|
| Hydrogen peroxide | 5 | 5 | 5 |
| Citric Acid | 2 | 2 | 2 |
| di-rhamnolipids | 10 | — | — |
| mono-rhamnolipids | — | 10 | — |
| glucolipids | — | — | 10 |
| persicomycin | 0.1 | 0.1 | 0.1 |
| DIETHYLENETRIAMINE PENTAMETHYLPHOSPHONATE | 0.1 | 0.1 | 0.1 |
| DISODIUM DISTYRYL BIPHENYL DISULFONATE | 0.2 | 0.2 | 0.2 |
| | Add water to 100% | Add water to 100% | Add water to 100% |
| pH | 5.0 | 5.0 | 5.0 |

| Ingredients | Detergent 67 | Detergent 68 | Detergent 69 |
|---|---|---|---|
| Hydrogen peroxide | 5 | 5 | 5 |
| Citric Acid | 2 | 2 | 2 |
| di-rhamnolipids | 10 | — | — |
| mono-rhamnolipids | — | 10 | — |
| glucolipids | — | — | 10 |
| persicomycin | 0.1 | 0.1 | 0.1 |
| FAEO C12-18, 3 EO | 2 | 2 | 2 |
| Glucopon 600 | 2 | 2 | 2 |
| SLES | 2 | 2 | 2 |
| DIETHYLENETRIAMINE PENTAMETHYLPHOSPHONATE | 0.1 | 0.1 | 0.1 |
| DISODIUM DISTYRYL BIPHENYL DISULFONATE | 0.2 | 0.2 | 0.2 |
| | Add water to 100% | Add water to 100% | Add water to 100% |
| pH | 5.0 | 5.0 | 5.0 |

| Ingredients | Detergent 70 | Detergent 71 | Detergent 72 |
|---|---|---|---|
| MEA soap from palm kernel oil | 2 | 2 | 2 |
| Sodium Citrate | 6 | 6 | 6 |
| di-rhamnolipids | 10 | — | — |
| mono-rhamnolipids | — | 10 | — |
| glucolipids | — | — | 10 |
| persicomycin | 0.1 | 0.1 | 0.1 |
| SLES | 5 | 5 | 5 |
| FAEO C12-18, 4 EO | 3 | 3 | 3 |
| Trilon ® M | 1 | 1 | 1 |
| Phenoxyethanol | 0.45 | 0.45 | 0.45 |
| KOH (aqueous solution) | 1.1 | 1.1 | 1.1 |

-continued

| Ingredients | Detergent 70 | Detergent 71 | Detergent 72 |
|---|---|---|---|
| Medley ® Brilliant 300 L | 2 | 2 | 2 |
| | Add water to 100% | Add water to 100% | Add water to 100% |
| pH | 8.0 | 8.2 | 8.1 |

| Ingredients | Detergent 73 | Detergent 74 | Detergent 75 |
|---|---|---|---|
| MEA soap from palm kernel oil | 2 | 2 | 2 |
| Sodium Citrate | 6 | 6 | 6 |
| di-rhamnolipids | 10 | — | — |
| mono-rhamnolipids | — | 10 | — |
| glucolipids | — | — | 10 |
| persicomycin | 0.1 | 0.1 | 0.1 |
| SLES | 5 | 5 | 5 |
| FAEO C12-18, 4 EO | 3 | 3 | 3 |
| Trilon ® M | 1 | 1 | 1 |
| Phenoxyethanol | 0.45 | 0.45 | 0.45 |
| Triathanolamine | 1.1 | 1.1 | 1.1 |
| Medley ® Brilliant 300 L | 2 | 2 | 2 |
| | Add water to 100% | Add water to 100% | Add water to 100% |
| pH | 8.0 | 8.2 | 8.1 |

| Ingredients | Detergent 74 | Detergent 75 | Detergent 76 |
|---|---|---|---|
| Na soap from palm kernel oil | 2 | 2 | 2 |
| Sodium Citrate | 6 | 6 | 6 |
| di-rhamnolipids | 10 | — | — |
| mono-rhamnolipids | — | 10 | — |
| glucolipids | — | — | 10 |
| persicomycin | 0.1 | 0.1 | 0.1 |
| SLES 3EO | 5 | 5 | 5 |
| FAEO C12-18, 7 EO | 5 | 5 | 5 |
| Dissolvine ® GLDA | 1 | 1 | 1 |
| Phenoxyethanol | 0.45 | 0.45 | 0.45 |
| NaOH (water solution) | 1 | 1 | 1 |
| Enzymes cocktail (proteases, amylases, lipases, mannanases, pecktinases, cellulalase, phosphodiesterases) | 2 | 2 | 2 |
| | Add water to 100% | Add water to 100% | Add water to 100% |
| pH | 8.0 | 8.2 | 8.1 |

| Ingredients | Detergent 77 | Detergent 78 | Detergent 79 |
|---|---|---|---|
| Na soap from palm kernel oil | 2 | 2 | 2 |
| Sodium Citrate | 6 | 6 | 6 |
| di-rhamnolipids | 10 | — | — |
| mono-rhamnolipids | — | 10 | — |
| glucolipids | — | — | 10 |
| persicomycin | 0.1 | 0.1 | 0.1 |
| SLES 3EO | 5 | 5 | 5 |
| FAEO C12-18, 7 EO | 5 | 5 | 5 |
| Dissolvine ® GLDA | 1 | 1 | 1 |
| Polymers (soil release, dye transfer inhibitors, rheology polymers, anti-redeposition, polycarboxylates, polyacrylates, polyvinyl alcohol, polyethylene glycol, Polyethyleneimine Ethoxylated) | 1 | 1 | 1 |

-continued

| Ingredients | Detergent 77 | Detergent 78 | Detergent 79 |
|---|---|---|---|
| Phenoxyethanol | 0.45 | 0.45 | 0.45 |
| NaOH (water solution) | 1 | 1 | 1 |
| Medley ® Brilliant 300 L | 2 | 2 | 2 |
| | Add water to 100% | Add water to 100% | Add water to 100% |
| pH | 8.0 | 8.2 | 8.1 |

| Ingredients | Detergent 80 | Detergent 81 | Detergent 82 |
|---|---|---|---|
| Na soap from palm kernel oil | 2 | 2 | 2 |
| Sodium Citrate | 6 | 6 | 6 |
| di-rhamnolipids | 10 | — | — |
| mono-rhamnolipids | — | 10 | — |
| glucolipids | — | — | 10 |
| persicomycin | 0.1 | 0.1 | 0.1 |
| SLES 3EO | 5 | 5 | 5 |
| FAEO C12-18, 7 EO | 5 | 5 | 5 |
| Dissolvine ® GLDA | 1 | 1 | 1 |
| Phenoxyethanol | 0.45 | 0.45 | 0.45 |
| NaOH (water solution) | 1 | 1 | 1 |
| Solvents (ethanol, glycerine, 1,2-propanediol) | 10 | 10 | 10 |
| Medley ® Brilliant 300 L | 2 | 2 | 2 |
| | Add water to 100% | Add water to 100% | Add water to 100% |
| pH | 8.0 | 8.2 | 8.1 |

| Ingredients | Detergent 83 | Detergent 84 | Detergent 85 |
|---|---|---|---|
| Na soap from palm kernel oil | 2 | 2 | 2 |
| Sodium Citrate | 6 | 6 | 6 |
| di-rhamnolipids | 10 | — | — |
| mono-rhamnolipids | — | 10 | — |
| glucolipids | — | — | 10 |
| persicomycin | 0.1 | 0.1 | 0.1 |
| SLES 3EO | 5 | 5 | 5 |
| FAEO C12-18, 7 EO | 5 | 5 | 5 |
| Builders (phosphonates, Tetrasodium glutamate diacetate, Trisodium dicarboxymethyl alaninate, monoethanolamine etidronate) | 1 | 1 | 1 |
| Phenoxyethanol | 0.45 | 0.45 | 0.45 |
| NaOH (water solution) | 1 | 1 | 1 |
| Medley ® Brilliant 300 L | 2 | 2 | 2 |
| | Add water to 100% | Add water to 100% | Add water to 100% |
| pH | 8.0 | 8.2 | 8.1 |

| Ingredients | Detergent 86 | Detergent 87 | Detergent 88 |
|---|---|---|---|
| Na soap from palm kernel oil | 2 | 2 | 2 |
| Sodium Citrate | 6 | 6 | 6 |
| di-rhamnolipids | 10 | — | — |
| mono-rhamnolipids | — | 10 | — |
| glucolipids | — | — | 10 |
| persicomycin | 0.1 | 0.1 | 0.1 |
| SLES 3EO | 5 | 5 | 5 |
| FAEO C12-18, 7 EO | 5 | 5 | 5 |
| Dissolvine ® GLDA | 1 | 1 | 1 |
| Phenoxyethanol | 0.45 | 0.45 | 0.45 |
| NaOH (water solution) | 1 | 1 | 1 |
| Medley ® Brilliant 300 L | 2 | 2 | 2 |

-continued

| Ingredients | Detergent 86 | Detergent 87 | Detergent 88 |
|---|---|---|---|
| Miscellaneous (fragrances, preservatives, dyes, pigments, Bitrex, sodium formate, sorbitol, ethoxylated M-toluidyne, antifoaming agent, trimethylsiloxysilicate, defoamers, solvents, Ethanol, porpylene glycol, monopropalene glycol, etylhexyl stearate, sulfated ethoxylated hexamethylenediamine quaternized, 2-aminoethanol sulfate (salt)) | 1 | 1 | 1 |
| | Add water to 100% | Add water to 100% | Add water to 100% |
| pH | 8.0 | 8.0 | 8.0 |

| Ingredients | Detergent 89 | Detergent 90 | Detergent 91 |
|---|---|---|---|
| Na soap from palm kernel oil | 2 | 2 | 2 |
| Sodium Citrate | 6 | 6 | 6 |
| di-rhamnolipids | 10 | — | — |
| mono-rhamnolipids | — | 10 | — |
| glucolipids | — | — | 10 |
| persicomycin | 0.1 | 0.1 | 0.1 |
| SLES 3EO | 5 | 5 | 5 |
| FAEO C12-18, 7 EO | 5 | 5 | 5 |
| Dissolvine ® GLDA | 1 | 1 | 1 |
| Phenoxyethanol | 0.45 | 0.45 | 0.45 |
| NaOH (water solution) | 1 | 1 | 1 |
| Medley ® Brilliant 300 L | 2 | 2 | 2 |
| Inorganic salts (sodium chloride, magnesium chloride, potassium chloride, potassium sulfite, sodium sulfite, calcium chloride) | 0.2 | 0.2 | 0.2 |
| | Add water to 100% | Add water to 100% | Add water to 100% |
| pH | 8.0 | 8.2 | 8.1 |

| Ingredients | Detergent 92 | Detergent 93 | Detergent 94 |
|---|---|---|---|
| MEA soap from palm kernel oil | 2 | 2 | 2 |
| Sodium Citrate | 6 | 6 | 6 |
| di-rhamnolipids | 10 | — | — |
| mono-rhamnolipids | — | 10 | — |
| glucolipids | — | — | 10 |
| persicomycin | 0.1 | 0.1 | 0.1 |
| SLES | 5 | 5 | 5 |
| Trilon ® M | 1 | 1 | 1 |
| Phenoxyethanol | 0.45 | 0.45 | 0.45 |
| Diethanol amine | 1.1 | 1.1 | 1.1 |
| Medley ® Brilliant 300 L | 2 | 2 | 2 |
| | Add water to 100% | Add water to 100% | Add water to 100% |
| pH | 8.0 | 8.2 | 8.1 |

| Ingredients | Detergent 95 | Detergent 96 | Detergent 97 |
|---|---|---|---|
| Na soap from palm kernel oil | 2 | 2 | 2 |
| Sodium Citrate | 6 | 6 | 6 |
| di-rhamnolipids | 10 | — | — |
| mono-rhamnolipids | — | 10 | — |
| glucolipids | — | — | 10 |
| persicomycin | 0.1 | 0.1 | 0.1 |
| SLES 3EO | 5 | 5 | 5 |
| Sorbitan Sesquioctanoate | 1 | 1 | 1 |

-continued

| Ingredients | Detergent 95 | Detergent 96 | Detergent 97 |
|---|---|---|---|
| FAEO C12-18, 7 EO | 5 | 5 | 5 |
| Dissolvine ® GLDA | 1 | 1 | 1 |
| Phenoxyethanol | 0.45 | 0.45 | 0.45 |
| NaOH (water solution) | 1 | 1 | 1 |
| Medley ® Brilliant 300 L | 2 | 2 | 2 |
| | Add water to 100% | Add water to 100% | Add water to 100% |
| ph | 8.0 | 8.2 | 8.1 |

| Ingredients | Detergent 98 | Detergent 99 | Detergent 100 |
|---|---|---|---|
| Fatty acid, saturated (Propanoic acid, Butanoic acid, Pentanoic acid, Hexanoic acid, Heptanoic acid, Octanoic acid, Nonanoic acid, Decanoic acid, Undecanoic acid, Dodecanoic acid, Tridecanoic acid, Tetradecanoic acid, Pentadecanoic acid, Hexadecanoic acid, Heptadecanoic acid, Nonadecanoic acid, Eicosanoic acid) | 2 | 2 | 2 |
| Sodium Citrate | 6 | 6 | 6 |
| di-rhamnolipids | 10 | — | — |
| mono-rhamnolipids | — | 10 | — |
| glucolipids | — | — | 10 |
| persicomycin | 0.1 | 0.1 | 0.1 |
| SLES 3EO | 5 | 5 | 5 |
| Sorbitan Sesquioctanoate | 1 | 1 | 1 |
| FAEO C12-18, 7 EO | 5 | 5 | 5 |
| Dissolvine ® GLDA | 1 | 1 | 1 |
| Phenoxyethanol | 0.45 | 0.45 | 0.45 |
| NaOH (water solution) | 1 | 1 | 1 |
| Medley ® Brilliant 300 L | 2 | 2 | 2 |
| | Add water to 100% | Add water to 100% | Add water to 100% |
| pH | 8.0 | 8.2 | 8.1 |

| Ingredients | Detergent 101 | Detergent 102 | Detergent 103 |
|---|---|---|---|
| Fatty acid, unsaturated (myristoleic acid, palmitoleic acid, sapienic acid, oleic acid, elaidic acid, vaccenic acid, linoleic acid, linoelaidic acid, alpha-linolenic acid, arachidonic acid, erucic acid, docosahexaenoic acid, and eicosapentaenoic acid) | 2 | 2 | 2 |
| Sodium Citrate | 6 | 6 | 6 |
| di-rhamnolipids | 10 | — | — |
| mono-rhamnolipids | — | 10 | — |
| glucolipids | — | — | 10 |
| persicomycin | 0.1 | 0.1 | 0.1 |
| SLES 3EO | 5 | 5 | 5 |
| FAEO C12-18, 7 EO | 5 | 5 | 5 |
| Dissolvine ® GLDA | 1 | 1 | 1 |
| Phenoxyethanol | 0.45 | 0.45 | 0.45 |
| NaOH (water solution) | 1 | 1 | 1 |
| Medley ® Brilliant 300 L | 2 | 2 | 2 |
| | Add water to 100% | Add water to 100% | Add water to 100% |
| pH | 8.0 | 8.2 | 8.1 |

| Ingredients | Detergent 104 | Detergent 105 | Detergent 106 |
|---|---|---|---|
| Na soap from palm kernel oil | 2 | 2 | 2 |
| Sodium Citrate | 6 | 6 | 6 |
| di-rhamnolipids | 10 | — | — |
| mono-rhamnolipids | — | 10 | — |
| glucolipids | — | — | 10 |
| persicomycin | 0.1 | 0.1 | 0.1 |
| SLES 3EO | 5 | 5 | 5 |
| FAEO C12-18, 7 EO | 5 | 5 | 5 |
| Dissolvine ® GLDA | 1 | 1 | 1 |
| Phenoxyethanol | 0.45 | 0.45 | 0.45 |
| NaOH (water solution) | 3 | 3 | 3 |
| Medley ® Brilliant 300 L | 2 | 2 | 2 |
| | Add water to 100% | Add water to 100% | Add water to 100% |
| pH | 9.5 | 9.5 | 9.5 |

| Ingredients | Detergent 104 | Detergent 105 | Detergent 106 |
|---|---|---|---|
| Fatty acid, unsaturated (myristoleic acid, palmitoleic acid, sapienic acid, oleic acid, elaidic acid, vaccenic acid, linoleic acid, linoelaidic acid, alpha-linolenic acid, arachidonic acid, erucic acid, docosahexaenoic acid, and eicosapentaenoic acid) | 6 | 6 | 6 |
| Sodium Citrate | 6 | 6 | 6 |
| di-rhamnolipids | 10 | — | — |
| mono-rhamnolipids | — | 10 | — |
| glucolipids | — | — | 10 |
| persicomycin | 0.1 | 0.1 | 0.1 |
| SLES 3EO | 5 | 5 | 5 |
| FAEO C12-18, 7 EO | 5 | 5 | 5 |
| Dissolvine ® GLDA | 1 | 1 | 1 |
| Phenoxyethanol | 0.45 | 0.45 | 0.45 |
| NaOH (water solution) | 1 | 1 | 1 |
| Medley ® Brilliant 300 L | 2 | 2 | 2 |
| | Add water to 100% | Add water to 100% | Add water to 100% |
| pH | 8.0 | 8.2 | 8.1 |

| Ingredients | Detergent 107 | Detergent 108 | Detergent 109 |
|---|---|---|---|
| Fatty acid, unsaturated (myristoleic acid, palmitoleic acid, sapienic acid, oleic acid, elaidic acid, vaccenic acid, linoleic acid, linoelaidic acid, alpha-linolenic acid, arachidonic acid, erucic acid, docosahexaenoic acid, and eicosapentaenoic acid) | 2 | 2 | 2 |
| Sodium Citrate | 6 | 6 | 6 |
| di-rhamnolipids | 10 | — | — |
| mono-rhamnolipids | — | 10 | — |
| glucolipids | — | — | 10 |
| persicomycin | 0.1 | 0.1 | 0.1 |
| SLES 3EO | 5 | 5 | 5 |
| FAEO C12-18, 4 EO | 5 | 5 | 5 |
| Dissolvine ® GLDA | 1 | 1 | 1 |
| Phenoxyethanol | 0.45 | 0.45 | 0.45 |
| NaOH (water solution) | 1 | 1 | 1 |
| Medley ® Brilliant 300 L | 2 | 2 | 2 |
| | Add water to 100% | Add water to 100% | Add water to 100% |
| pH | 8.0 | 8.2 | 8.1 |

| Ingredients | Detergent 110 | Detergent 111 | Detergent 112 |
|---|---|---|---|
| Na soap from palm kernel oil | 2 | 2 | 2 |
| Sodium Citrate | 6 | 6 | 6 |
| di-rhamnolipids | 10 | — | — |
| mono-rhamnolipids | — | 10 | — |
| glucolipids | — | — | 10 |
| persicomycin | 0.1 | 0.1 | 0.1 |
| SLES 3EO | 5 | 5 | 5 |
| FAEO C12-18, 3 EO | 5 | 5 | 5 |
| Dissolvine ® GLDA | 1 | 1 | 1 |
| Phenoxyethanol | 0.45 | 0.45 | 0.45 |
| NaOH (water solution) | 1 | 1 | 1 |
| | Add water to 100% | Add water to 100% | Add water to 100% |
| pH | 8.0 | 8.2 | 8.1 |

| Ingredients | Detergent 113 | Detergent 114 | Detergent 115 |
|---|---|---|---|
| Na soap from palm kernel oil | 3.85 | 3.85 | 3.85 |
| Sodium Citrate | 6 | 6 | 6 |
| di-rhamnolipids | 20 | — | — |
| mono-rhamnolipids | — | 20 | — |
| glucolipids | — | — | 20 |
| persicomycin | 0.1 | 0.1 | 0.1 |
| SLES 3EO | 5 | 5 | 5 |
| Monoethanolamine | 5.95 | 5.95 | 5.95 |
| Trilon M | 2 | 2 | 2 |
| Citric acid | 3 | 3 | 3 |
| Medley ® Brilliant 300 L | 2 | 2 | 2 |
| Phenoxyethanol | 1 | 1 | 1 |
| | Add water to 100% | Add water to 100% | Add water to 100% |
| pH | 8.0 | 8.2 | 8.1 |

| Ingredients | Detergent 116 | Detergent 117 | Detergent 118 |
|---|---|---|---|
| Na soap from palm kernel oil | 3.85 | 3.85 | 3.85 |
| di-rhamnolipids | 15 | — | — |
| mono-rhamnolipids | — | 15 | — |
| glucolipids | — | — | 15 |

-continued

| Ingredients | Detergent 116 | Detergent 117 | Detergent 118 |
|---|---|---|---|
| persicomycin | 0.1 | 0.1 | 0.1 |
| SLES 3EO | 10 | 10 | 10 |
| Monoethanolamine | 5.95 | 5.95 | 5.95 |
| Trilon M | 2 | 2 | 2 |
| Citric acid | 3 | 3 | 3 |
| Medley ® Brilliant 300 L | 2 | 2 | 2 |
| Phenoxyethanol | 1 | 1 | 1 |
| | Add water to 100% | Add water to 100% | Add water to 100% |
| pH | 8.0 | 8.2 | 8.1 |

| Ingredients | Detergent 119 | Detergent 120 | Detergent 121 |
|---|---|---|---|
| Na soap from palm kernel oil | 3.85 | 3.85 | 3.85 |
| Sodium Citrate | 6 | 6 | 6 |
| di-rhamnolipids | 15 | — | — |
| mono-rhamnolipids | — | 15 | — |
| glucolipids | — | — | 15 |
| persicomycin | 0.1 | 0.1 | 0.1 |
| SLES 3EO | 5 | 5 | 5 |
| Monoethanolamine | 5.95 | 5.95 | 5.95 |
| Trilon M | 2 | 2 | 2 |
| WeylClean PLA 1 | 1 | 1 | 1 |
| Citric acid | 3 | 3 | 3 |
| Medley ® Brilliant 300 L | 2 | 2 | 2 |
| Phenoxyethanol | 1 | 1 | 1 |
| | Add water to 100% | Add water to 100% | Add water to 100% |
| pH | 8.0 | 8.2 | 8.1 |

| Ingredients | Detergent 122 | Detergent 123 | Detergent 124 |
|---|---|---|---|
| Na soap from palm kernel oil | 3.85 | 3.85 | 3.85 |
| di-rhamnolipids | 15 | — | — |
| mono-rhamnolipids | — | 15 | — |
| glucolipids | — | — | 15 |
| persicomycin | 0.1 | 0.1 | 0.1 |
| SLES 3EO | 5 | 5 | 5 |
| Monoethanolamine | 5.95 | 5.95 | 5.95 |
| Trilon M | 2 | 2 | 2 |
| Texacare SRN 170 Terra | 1 | 1 | 1 |
| Citric acid | 3 | 3 | 3 |
| Medley ® Brilliant 300 L | 2 | 2 | 2 |
| Phenoxyethanol | 1 | 1 | 1 |
| | Add water to 100% | Add water to 100% | Add water to 100% |
| pH | 8.0 | 8.2 | 8.1 |

| Ingredients | Detergent 125 | Detergent 126 | Detergent 127 |
|---|---|---|---|
| Na soap from palm kernel oil | 3.85 | 3.85 | 3.85 |
| di-rhamnolipids | 15 | — | — |
| mono-rhamnolipids | — | 15 | — |
| glucolipids | — | — | 15 |
| persicomycin | 0.1 | 0.1 | 0.1 |
| SLES 3EO | 5 | 5 | 5 |
| Monoethanolamine | 5.95 | 5.95 | 5.95 |
| Trilon M | 2 | 2 | 2 |
| Na-Carboxymethylinnulin | 1 | 1 | 1 |
| Citric acid | 3 | 3 | 3 |

-continued

| Ingredients | Detergent 125 | Detergent 126 | Detergent 127 |
|---|---|---|---|
| Medley ® Brilliant 300 L | 2 | 2 | 2 |
| Phenoxyethanol | 1 | 1 | 1 |
| | Add water to 100% | Add water to 100% | Add water to 100% |
| pH | 8.0 | 8.2 | 8.1 |

| Ingredients | Detergent 128 | Detergent 129 | Detergent 130 |
|---|---|---|---|
| Na soap from palm kernel oil | 3.85 | 3.85 | 3.85 |
| di-rhamnolipids | 15 | — | — |
| mono-rhamnolipids | — | 15 | — |
| glucolipids | — | — | 15 |
| persicomycin | 0.1 | 0.1 | 0.1 |
| SLES 3EO | 5 | 5 | 5 |
| Monoethanolamine | 5.95 | 5.95 | 5.95 |
| Trilon M | 2 | 2 | 2 |
| FAEO C12-18, 4 EO | 5 | 5 | 5 |
| Citric acid | 3 | 3 | 3 |
| Medley ® Brilliant 300 L | 2 | 2 | 2 |
| Phenoxyethanol | 1 | 1 | 1 |
| | Add water to 100% | Add water to 100% | Add water to 100% |
| pH | 8.0 | 8.2 | 8.1 |

| Ingredients | Detergent 131 | Detergent 132 | Detergent 133 |
|---|---|---|---|
| Na soap from palm kernel oil | 3.85 | 3.85 | 3.85 |
| di-rhamnolipids | 15 | — | — |
| mono-rhamnolipids | — | 15 | — |
| glucolipids | — | — | 15 |
| persicomycin | 0.1 | 0.1 | 0.1 |
| SLES 3EO | 5 | 5 | 5 |
| Monoethanolamine | 5.95 | 5.95 | 5.95 |
| Trilon M | 2 | 2 | 2 |
| FAEO C12-18, 7 EO | 5 | 5 | 5 |
| Citric acid | 3 | 3 | 3 |
| Medley ® Brilliant 300 L | 2 | 2 | 2 |
| Phenoxyethanol | 1 | 1 | 1 |
| | Add water to 100% | Add water to 100% | Add water to 100% |
| pH | 8.0 | 8.2 | 8.1 |

| Ingredients | Detergent 134 | Detergent 135 | Detergent 136 |
|---|---|---|---|
| Na soap from palm kernel oil | 3.85 | 3.85 | 3.85 |
| di-rhamnolipids | 15 | — | — |
| mono-rhamnolipids | — | 15 | — |
| glucolipids | — | — | 15 |
| persicomycin | 0.1 | 0.1 | 0.1 |
| SLES 3EO | 5 | 5 | 5 |
| Monoethanolamine | 5.95 | 5.95 | 5.95 |
| Trilon M | 2 | 2 | 2 |
| Citric acid | 3 | 3 | 3 |
| Medley ® Brilliant 300 L | 2 | 2 | 2 |
| Phenoxyethanol | 1 | 1 | 1 |
| | Add water to 100% | Add water to 100% | Add water to 100% |
| pH | 8.0 | 8.2 | 8.1 |

| Ingredients | Detergent 137 | Detergent 138 | Detergent 139 |
|---|---|---|---|
| Na soap from palm kernel oil | 3.85 | 3.85 | 3.85 |
| di-rhamnolipids | 15 | — | — |
| mono-rhamnolipids | — | 15 | — |
| glucolipids | — | — | 15 |
| persicomycin | 0.1 | 0.1 | 0.1 |
| SLES 3EO | 5 | 5 | 5 |
| Monoethanolamine | 5.95 | 5.95 | 5.95 |
| Trilon M | 2 | 2 | 2 |
| Citric acid | 6 | 6 | 6 |
| Medley ® Brilliant 300 L | 2 | 2 | 2 |
| Phenoxyethanol | 1 | 1 | 1 |
| | Add water to 100% | Add water to 100% | Add water to 100% |
| pH | 8.0 | 8.2 | 8.1 |

| Ingredients | Detergent 140 | Detergent 141 | Detergent 142 |
|---|---|---|---|
| Na soap from palm kernel oil | 3.85 | 3.85 | 3.85 |
| di-rhamnolipids | 15 | — | — |
| mono-rhamnolipids | — | 15 | — |
| glucolipids | — | — | 15 |
| persicomycin | 0.1 | 0.1 | 0.1 |
| SLES 3EO | 5 | 5 | 5 |
| Sophorolipids | 5 | 5 | 5 |
| Monoethanolamine | 5.95 | 5.95 | 5.95 |
| Trilon M | 2 | 2 | 2 |
| Citric acid | 3 | 3 | 3 |
| Medley ® Brilliant 300 L | 2 | 2 | 2 |
| Phenoxyethanol | 1 | 1 | 1 |
| | Add water to 100% | Add water to 100% | Add water to 100% |
| pH | 8.0 | 8.2 | 8.1 |

| Ingredients | Detergent 143 | Detergent 144 | Detergent 145 |
|---|---|---|---|
| Na soap from palm kernel oil | 3.85 | 3.85 | 3.85 |
| di-rhamnolipids | 15 | — | — |
| mono-rhamnolipids | — | 15 | — |
| glucolipids | — | — | 15 |
| persicomycin | 0.1 | 0.1 | 0.1 |
| SLES 3EO | 5 | 5 | 5 |
| REWOTERIC AM C | 5 | 5 | 5 |
| Monoethanolamine | 5.95 | 5.95 | 5.95 |
| Trilon M | 2 | 2 | 2 |
| Citric acid | 3 | 3 | 3 |
| Medley ® Brilliant 300 L | 2 | 2 | 2 |
| Phenoxyethanol | 1 | 1 | 1 |
| | Add water to 100 % | Add water to 100 % | Add water to 100 % |
| pH | 8.0 | 8.2 | 8.1 |

| Ingredients | Detergent 146 | Detergent 147 | Detergent 148 |
|---|---|---|---|
| Na soap from palm kernel oil | 3.85 | 3.85 | 3.85 |
| di-rhamnolipids | 15 | — | — |
| mono-rhamnolipids | — | 15 | — |
| glucolipids | — | — | 15 |
| persicomycin | 0.1 | 0.1 | 0.1 |
| SLES 3EO | 5 | 5 | 5 |
| Na-Laurylsulfat (C12-18) | 5 | 5 | 5 |
| Monoethanolamine | 5.95 | 5.95 | 5.95 |
| Trilon M | 2 | 2 | 2 |

-continued

| Ingredients | Detergent 146 | Detergent 147 | Detergent 148 |
|---|---|---|---|
| Citric acid | 3 | 3 | 3 |
| Medley ® Brilliant 300 L | 2 | 2 | 2 |
| Phenoxyethanol | 1 | 1 | 1 |
| | Add water to 100% | Add water to 100% | Add water to 100% |
| pH | 8.0 | 8.2 | 8.1 |

| Ingredients | Detergent 146 | Detergent 147 | Detergent 148 |
|---|---|---|---|
| Na soap from palm kernel oil | 3.85 | 3.85 | 3.85 |
| di-rhamnolipids | 15 | — | — |
| mono-rhamnolipids | — | 15 | — |
| glucolipids | — | — | 15 |
| persicomycin | 0.1 | 0.1 | 0.1 |
| SLES 3EO | 5 | 5 | 5 |
| C10C16-Alkyl polyglucoside | 5 | 5 | 5 |
| Monoethanolamine | 5.95 | 5.95 | 5.95 |
| Trilon M | 2 | 2 | 2 |
| Citric acid | 3 | 3 | 3 |
| Medley ® Brilliant 300 L | 2 | 2 | 2 |
| Phenoxyethanol | 1 | 1 | 1 |
| | Add water to 100% | Add water to 100% | Add water to 100% |
| pH | 8.0 | 8.2 | 8.1 |

| Ingredients | Detergent 149 | Detergent 150 | Detergent 151 |
|---|---|---|---|
| Na soap from palm kernel oil | 3.85 | 3.85 | 3.85 |
| di-rhamnolipids | 15 | — | — |
| mono-rhamnolipids | — | 15 | — |
| glucolipids | — | — | 15 |
| persicomycin | 0.1 | 0.1 | 0.1 |
| SLES 3EO | 5 | 5 | 5 |
| C8C16-Alkyl polyglucoside | 5 | 5 | 5 |
| Monoethanolamine | 5.95 | 5.95 | 5.95 |
| Trilon M | 2 | 2 | 2 |
| Citric acid | 3 | 3 | 3 |
| Medley ® Brilliant 300 L | 2 | 2 | 2 |
| Phenoxyethanol | 1 | 1 | 1 |
| | Add water to 100% | Add water to 100% | Add water to 100% |
| ph | 8.0 | 8.2 | 8.1 |

| Ingredients | Detergent 152 | Detergent 153 | Detergent 154 |
|---|---|---|---|
| Na soap from palm kernel oil | 3.85 | 3.85 | 3.85 |
| di-rhamnolipids | 15 | — | — |
| mono-rhamnolipids | — | 15 | — |
| glucolipids | — | — | 15 |
| persicomycin | 0.1 | 0.1 | 0.1 |
| C8C16-Alkyl polyglucoside | 5 | 5 | 5 |
| Monoethanolamine | 5.95 | 5.95 | 5.95 |
| Trilon M | 2 | 2 | 2 |
| Citric acid | 3 | 3 | 3 |
| Medley ® Brilliant 300 L | 2 | 2 | 2 |
| Phenoxyethanol | 1 | 1 | 1 |
| | Add water to 100% | Add water to 100% | Add water to 100% |
| pH | 8.0 | 8.2 | 8.1 |

| Ingredients | Detergent 149 | Detergent 150 | Detergent 151 |
|---|---|---|---|
| Na soap from palm kernel oil | 3.85 | 3.85 | 3.85 |
| di-rhamnolipids | 15 | — | — |
| mono-rhamnolipids | — | 15 | — |
| glucolipids | — | — | 15 |
| persicomycin | 0.1 | 0.1 | 0.1 |
| SLES 3EO | 5 | 5 | 5 |
| C8C16-Alkyl polyglucoside | 5 | 5 | 5 |
| Monoethanolamine | 5.95 | 5.95 | 5.95 |
| Trilon M | 2 | 2 | 2 |
| WeylClean PLA 1 | 1 | 1 | 1 |
| Citric acid | 3 | 3 | 3 |
| Medley ® Brilliant 300 L | 2 | 2 | 2 |
| Phenoxyethanol | 1 | 1 | 1 |
| | Add water to 100% | Add water to 100% | Add water to 100% |
| pH | 8.0 | 8.2 | 8.1 |

| Ingredients | Detergent 152 | Detergent 153 | Detergent 154 |
|---|---|---|---|
| Na soap from palm kernel oil | 3.85 | 3.85 | 3.85 |
| di-rhamnolipids | 10 | — | — |
| mono-rhamnolipids | — | 10 | — |
| glucolipids | — | — | 10 |
| persicomycin | 0.1 | 0.1 | 0.1 |
| SLES 3EO | 10 | 10 | 10 |
| C8C16-Alkyl polyglucoside | 5 | 5 | 5 |
| Monoethanolamine | 5.95 | 5.95 | 5.95 |
| Trilon M | 2 | 2 | 2 |
| Citric acid | 3 | 3 | 3 |
| Medley ® Brilliant 300 L | 2 | 2 | 2 |
| Phenoxyethanol | 1 | 1 | 1 |
| | Add water to 100% | Add water to 100% | Add water to 100% |
| pH | 8.0 | 8.2 | 8.1 |

| Ingredients | Detergent 155 | Detergent 156 | Detergent 157 |
|---|---|---|---|
| Na soap from palm kernel oil | 3.85 | 3.85 | 3.85 |
| di-rhamnolipids | 15 | — | — |
| mono-rhamnolipids | — | 15 | — |
| glucolipids | — | — | 15 |
| persicomycin | 0.1 | 0.1 | 0.1 |
| SLES 3EO | 5 | 5 | 5 |
| C10C16-Alkyl polyglucoside | 5 | 5 | 5 |
| Monoethanolamine | 5.95 | 5.95 | 5.95 |
| Propylene glycol | 2 | 2 | 2 |
| Trilon M | 2 | 2 | 2 |
| Citric acid | 3 | 3 | 3 |
| Medley ® Brilliant 300 L | 2 | 2 | 2 |
| Phenoxyethanol | 1 | 1 | 1 |
| | Add water to 100% | Add water to 100% | Add water to 100% |
| pH | 8.0 | 8.2 | 8.1 |

| Ingredients | Detergent 158 | Detergent 159 | Detergent 160 |
|---|---|---|---|
| MEA cocoate | 10 | 10 | 10 |
| di-rhamnolipids | 10 | — | — |
| mono-rhamnolipids | — | 10 | — |
| glucolipids | — | — | 10 |
| persicomycin | 0.1 | 0.1 | 0.1 |
| SLES 3EO | 10 | 10 | 10 |
| C10C16-Alkyl polyglucoside | 5 | 5 | 5 |
| Monoethanolamine | 5.95 | 5.95 | 5.95 |
| Propylene glycol | 2 | 2 | 2 |
| Trilon M | 2 | 2 | 2 |
| MEA citrate | 5 | 5 | 5 |
| Medley ® Brilliant 300 L | 2 | 2 | 2 |
| Phenoxyethanol | 1 | 1 | 1 |
| | Add water to 100% | Add water to 100% | Add water to 100% |
| pH | 8.0 | 8.2 | 8.1 |

| Ingredients | Detergent 161 | Detergent 162 | Detergent 163 |
|---|---|---|---|
| Na soap from palm kernel oil | 3.85 | 3.85 | 3.85 |
| di-rhamnolipids | 15 | — | — |
| mono-rhamnolipids | — | 15 | — |
| glucolipids | — | — | 15 |
| persicomycin | 0.1 | 0.1 | 0.1 |
| SLES 3EO | 5 | 5 | 5 |
| C10C16-Alkyl polyglucoside | 5 | 5 | 5 |
| Monoethanolamine | 5.95 | 5.95 | 5.95 |
| Solvents (ethanol, mono propylene glycol, propylene glycol, dipropylene glycol) | 3 | 3 | 3 |
| Trilon M | 2 | 2 | 2 |
| Citric acid | 3 | 3 | 3 |
| Medley ® Brilliant 300 L | 2 | 2 | 2 |
| Phenoxyethanol | 1 | 1 | 1 |
| | Add water to 100% | Add water to 100% | Add water to 100% |
| pH | 8.0 | 8.2 | 8.1 |

| Ingredients | Detergent 164 | Detergent 165 | Detergent 166 |
|---|---|---|---|
| Na soap from palm kernel oil | 2 | 2 | 2 |
| Sodium Citrate | 6 | 6 | 6 |
| di-rhamnolipids | 5 | — | — |
| mono-rhamnolipids | — | 5 | — |
| glucolipids | — | — | 5 |
| persicomycin | 0.1 | 0.1 | 0.1 |
| SLES 3EO | 10 | 10 | 10 |
| FAEO C12-18, 7 EO | 5 | 5 | 5 |
| Dissolvine ® GLDA | 1 | 1 | 1 |
| Phenoxyethanol | 0.45 | 0.45 | 0.45 |
| NaOH (water solution) | 1 | 1 | 1 |
| Medley ® Brilliant 300 L | 2 | 2 | 2 |
| | Add water to 100% | Add water to 100% | Add water to 100% |
| pH | 8.0 | 8.2 | 8.1 |

| Ingredients | Detergent 167 | Detergent 168 | Detergent 169 |
|---|---|---|---|
| Na soap from palm kernel oil | 2 | 2 | 2 |
| Sodium Citrate | 6 | 6 | 6 |
| di-rhamnolipids | 10 | — | — |
| mono-rhamnolipids | — | 10 | — |
| glucolipids | — | — | 10 |
| persicomycin | 0.1 | 0.1 | 0.1 |
| SLES 3EO | 5 | 5 | 5 |
| FAEO C12-18, 3 EO | 5 | 5 | 5 |
| Xantham Gum | 0.2 | 0.2 | 0.2 |
| Dissolvine ® GLDA | 1 | 1 | 1 |
| Phenoxyethanol | 0.45 | 0.45 | 0.45 |
| NaOH (water solution) | 1 | 1 | 1 |
| | Add water to 100% | Add water to 100% | Add water to 100% |
| pH | 8.0 | 8.2 | 8.1 |

| Ingredients | Detergent 170 | Detergent 171 | Detergent 172 |
|---|---|---|---|
| Na soap from palm kernel oil | 2 | 2 | 2 |
| Sodium Citrate | 6 | 6 | 6 |
| di-rhamnolipids | 15 | — | — |
| mono-rhamnolipids | — | 15 | — |
| glucolipids | — | — | 15 |
| persicomycin | 0.1 | 0.1 | 0.1 |
| Xantham Gum | 0.2 | 0.2 | 0.2 |
| Dissolvine ® GLDA | 1 | 1 | 1 |
| Phenoxyethanol | 0.45 | 0.45 | 0.45 |
| NaOH (water solution) | 1 | 1 | 1 |
| | Add water to 100% | Add water to 100% | Add water to 100% |
| pH | 8.0 | 8.2 | 8.1 |

| Ingredients | Detergent 173 | Detergent 174 | Detergent 175 |
|---|---|---|---|
| Na soap from palm kernel oil | 3.85 | 3.85 | 3.85 |
| di-rhamnolipids | 15 | — | — |
| mono-rhamnolipids | — | 15 | — |
| glucolipids | — | — | 15 |
| persicomycin | 0.1 | 0.1 | 0.1 |
| SLES 3EO | 10 | 10 | 10 |
| Monoethanolamine | 5.95 | 5.95 | 5.95 |
| Hydropgen peroxide | 5 | 5 | 5 |
| Trilon M | 2 | 2 | 2 |
| Citric acid | 3 | 3 | 3 |
| Medley ® Brilliant 300 L | 2 | 2 | 2 |

-continued

| Ingredients | Detergent 173 | Detergent 174 | Detergent 175 |
|---|---|---|---|
| Phenoxyethanol | 1 | 1 | 1 |
| | Add water to 100% | Add water to 100% | Add water to 100% |
| pH | 8.0 | 8.2 | 8.1 |

| Ingredients | Detergent 173 | Detergent 174 | Detergent 175 |
|---|---|---|---|
| Na soap from palm kernel oil | 3.85 | 3.85 | 3.85 |
| di-rhamnolipids | 15 | — | — |
| mono-rhamnolipids | — | 15 | — |
| glucolipids | — | — | 15 |
| persicomycin | 0.1 | 0.1 | 0.1 |
| SLES 3EO | 5 | 5 | 5 |
| C10C16-Alkyl polyglucoside | 5 | 5 | 5 |
| Monoethanolamine | 5.95 | 5.95 | 5.95 |
| Hydropgen peroxide | 5 | 5 | 5 |
| Trilon M | 2 | 2 | 2 |
| Citric acid | 3 | 3 | 3 |
| Medley ® Brilliant 300 L | 2 | 2 | 2 |
| Phenoxyethanol | 1 | 1 | 1 |
| | Add water to 100% | Add water to 100% | Add water to 100% |
| pH | 8.0 | 8.2 | 8.1 |

| Ingredients | Detergent 176 | Detergent 177 | Detergent 178 |
|---|---|---|---|
| Na soap from palm kernel oil | 3.85 | 3.85 | 3.85 |
| di-rhamnolipids | 20 | — | — |
| mono-rhamnolipids | — | 20 | — |
| glucolipids | — | — | 20 |
| persicomycin | 0.1 | 0.1 | 0.1 |
| SLES 3EO | 5 | 5 | 5 |
| C10C16-Alkyl polyglucoside | 5 | 5 | 5 |
| Monoethanolamine | 5.95 | 5.95 | 5.95 |
| Hydropgen peroxide | 5 | 5 | 5 |
| Trilon M | 2 | 2 | 2 |
| Citric acid | 3 | 3 | 3 |
| Medley ® Brilliant 300 L | 2 | 2 | 2 |
| Phenoxyethanol | 1 | 1 | 1 |
| | Add water to 100% | Add water to 100% | Add water to 100% |
| pH | 8.0 | 8.2 | 8.1 |

| Ingredients | Detergent 179 | Detergent 180 | Detergent 181 |
|---|---|---|---|
| Na soap from palm kernel oil | 3.85 | 3.85 | 3.85 |
| di-rhamnolipids | 20 | — | — |
| mono-rhamnolipids | — | 20 | — |
| glucolipids | — | — | 20 |
| persicomycin | 0.1 | 0.1 | 0.1 |
| C10C16-Alkyl polyglucoside | 5 | 5 | 5 |
| Monoethanolamine | 5.95 | 5.95 | 5.95 |
| Hydropgen peroxide | 5 | 5 | 5 |
| Trilon M | 2 | 2 | 2 |
| Citric acid | 3 | 3 | 3 |
| Medley ® Brilliant 300 L | 2 | 2 | 2 |
| Phenoxyethanol | 1 | 1 | 1 |
| | Add water to 100% | Add water to 100% | Add water to 100% |
| pH | 8.0 | 8.2 | 8.1 |

| Ingredients | Detergent 182 | Detergent 183 | Detergent 184 |
|---|---|---|---|
| Na soap from palm kernel oil | 2 | 2 | 2 |
| Sodium Citrate | 6 | 6 | 6 |
| di-rhamnolipids | 10 | — | — |
| mono-rhamnolipids | — | 10 | — |
| glucolipids | — | — | 10 |
| persicomycin | 1 | 1 | 1 |
| SLES 3EO | 5 | 5 | 5 |
| FAEO C12-18, 7 EO | 5 | 5 | 5 |
| Dissolvine ® GLDA | 1 | 1 | 1 |
| Phenoxyethanol | 0.45 | 0.45 | 0.45 |
| NaOH (water solution) | 1 | 1 | 1 |
| Medley ® Brilliant 300 L | 2 | 2 | 2 |
| | Add water to 100% | Add water to 100% | Add water to 100% |
| pH | 8.0 | 8.2 | 8.1 |

| Ingredients | Detergent 185 | Detergent 186 | Detergent 187 |
|---|---|---|---|
| Na soap from palm kernel oil | 2 | 2 | 2 |
| Sodium Citrate | 6 | 6 | 6 |
| di-rhamnolipids | 10 | — | — |
| mono-rhamnolipids | — | 10 | — |
| glucolipids | — | — | 10 |
| persicomycin | 1 | 1 | 1 |
| SLES 3EO | 5 | 5 | 5 |
| FAEO C12-18, 3 EO | 5 | 5 | 5 |
| Dissolvine ® GLDA | 1 | 1 | 1 |
| Phenoxyethanol | 0.45 | 0.45 | 0.45 |
| NaOH (water solution) | 1 | 1 | 1 |
| Medley ® Brilliant 300 L | 2 | 2 | 2 |
| | Add water to 100% | Add water to 100% | Add water to 100% |
| pH | 8.0 | 8.2 | 8.1 |

| Ingredients | Detergent 188 | Detergent 189 | Detergent 190 |
|---|---|---|---|
| Na soap from palm kernel oil | 2 | 2 | 2 |
| Sodium Citrate | 6 | 6 | 6 |
| di-rhamnolipids | 10 | — | — |
| mono-rhamnolipids | — | 10 | — |
| glucolipids | — | — | 10 |
| persicomycin | 1 | 1 | 1 |
| SLES 3EO | 5 | 5 | 5 |
| FAEO C12-18, 4 EO | 5 | 5 | 5 |
| Dissolvine ® GLDA | 1 | 1 | 1 |
| Phenoxyethanol | 0.45 | 0.45 | 0.45 |
| NaOH (water solution) | 1 | 1 | 1 |
| Medley ® Brilliant 300 L | 2 | 2 | 2 |
| | Add water to 100% | Add water to 100% | Add water to 100% |
| pH | 8.0 | 8.2 | 8.1 |

| Ingredients | Detergent 191 | Detergent 192 | Detergent 193 |
|---|---|---|---|
| Na soap from palm kernel oil | 2 | 2 | 2 |
| Sodium Citrate | 6 | 6 | 6 |
| di-rhamnolipids | 10 | — | — |
| mono-rhamnolipids | — | 10 | — |
| glucolipids | — | — | 10 |
| persicomycin | 1 | 1 | 1 |
| FAEO C12-18, 4 EO | 5 | 5 | 5 |
| Dissolvine ® GLDA | 1 | 1 | 1 |

-continued

| Ingredients | Detergent 191 | Detergent 192 | Detergent 193 |
|---|---|---|---|
| Phenoxyethanol | 0.45 | 0.45 | 0.45 |
| NaOH (water solution) | 1 | 1 | 1 |
| Medley ® Brilliant 300 L | 2 | 2 | 2 |
| | Add water to 100% | Add water to 100% | Add water to 100% |
| pH | 8.0 | 8.2 | 8.1 |

| Ingredients | Detergent 194 | Detergent 195 | Detergent 196 |
|---|---|---|---|
| Na soap from palm kernel oil | 2 | 2 | 2 |
| Sodium Citrate | 6 | 6 | 6 |
| di-rhamnolipids | 10 | — | — |
| mono-rhamnolipids | — | 10 | — |
| glucolipids | — | — | 10 |
| persicomycin | 1 | 1 | 1 |
| SLES 3EO | 5 | 5 | 5 |
| Glucopon USP 600 (APG) | 5 | 5 | 5 |
| Dissolvine ® GLDA | 1 | 1 | 1 |
| Phenoxyethanol | 0.45 | 0.45 | 0.45 |
| NaOH (water solution) | 1 | 1 | 1 |
| Medley ® Brilliant 300 L | 2 | 2 | 2 |
| | Add water to 100% | Add water to 100% | Add water to 100% |
| pH | 8.0 | 8.2 | 8.1 |

| Ingredients | Detergent 197 | Detergent 198 | Detergent 199 |
|---|---|---|---|
| Na soap from palm kernel oil | 2 | 2 | 2 |
| Sodium Citrate | 6 | 6 | 6 |
| di-rhamnolipids | 10 | — | — |
| mono-rhamnolipids | — | 10 | — |
| glucolipids | — | — | 10 |
| persicomycin | 1 | 1 | 1 |
| Glucopon USP 600 (APG) | 5 | 5 | 5 |
| Dissolvine ® GLDA | 1 | 1 | 1 |
| Phenoxyethanol | 0.45 | 0.45 | 0.45 |
| NaOH (water solution) | 1 | 1 | 1 |
| Medley ® Brilliant 300 L | 2 | 2 | 2 |
| | Add water to 100% | Add water to 100% | Add water to 100% |
| pH | 8.0 | 8.2 | 8.1 |

| Ingredients | Detergent 200 | Detergent 201 | Detergent 202 |
|---|---|---|---|
| Na soap from palm kernel oil | 2 | 2 | 2 |
| Sodium Citrate | 6 | 6 | 6 |
| di-rhamnolipids | 10 | — | — |
| mono-rhamnolipids | — | 10 | — |
| glucolipids | — | — | 10 |
| persicomycin | 1 | 1 | 1 |
| Myristic acid | 2.5 | 2.5 | 2.5 |
| Dissolvine ® GLDA | 1 | 1 | 1 |
| Phenoxyethanol | 0.45 | 0.45 | 0.45 |
| NaOH (water solution) | 1 | 1 | 1 |
| Medley ® Brilliant 300 L | 2 | 2 | 2 |
| | Add water to 100% | Add water to 100% | Add water to 100% |
| pH | 8.0 | 8.2 | 8.1 |

| Ingredients | Detergent 203 | Detergent 24 | Detergent 205 |
|---|---|---|---|
| Na soap from palm kernel oil | 2 | 2 | 2 |
| Sodium Citrate | 6 | 6 | 6 |
| di-rhamnolipids | 10 | — | — |
| mono-rhamnolipids | — | 10 | — |
| glucolipids | — | — | 10 |
| persicomycin | 1 | 1 | — |
| Lauric acid | 2.5 | 2.5 | 2.5 |
| Dissolvine ® GLDA | 1 | 1 | 1 |
| Phenoxyethanol | 0.45 | 0.45 | 0.45 |
| NaOH (water solution) | 1 | 1 | 1 |
| Medley ® Brilliant 300 L | 2 | 2 | 2 |
| | Add water to 100% | Add water to 100% | Add water to 100% |
| pH | 8.0 | 8.2 | 8.1 |

| Ingredients | Detergent 206 | Detergent 207 | Detergent 208 |
|---|---|---|---|
| Na soap from palm kernel oil | 2 | 2 | 2 |
| Sodium Citrate | 6 | 6 | 6 |
| di-rhamnolipids | 10 | — | — |
| mono-rhamnolipids | — | 10 | — |
| glucolipids | — | — | 10 |
| persicomycin | 1 | 1 | 1 |
| SLES 3EO | 5 | 5 | 5 |
| FAEO C12-18, 5 EO | 5 | 5 | 5 |
| Dissolvine ® GLDA | 1 | 1 | 1 |
| Phenoxyethanol | 0.45 | 0.45 | 0.45 |
| NaOH (water solution) | 1 | 1 | 1 |
| Medley ® Brilliant 300 L | 2 | 2 | 2 |
| | Add water to 100% | Add water to 100% | Add water to 100% |
| pH | 8.0 | 8.2 | 8.1 |

| Ingredients | Detergent 209 | Detergent 210 | Detergent 211 |
|---|---|---|---|
| Na soap from palm kernel oil | 2 | 2 | 2 |
| Sodium Citrate | 6 | 6 | 6 |
| di-rhamnolipids | 10 | — | — |
| mono-rhamnolipids | — | 10 | — |
| glucolipids | — | — | 10 |
| persicomycin | 1 | 1 | 1 |
| SLES 3EO | 5 | 5 | 5 |
| REWOTERIC AM V | 5 | 5 | 5 |
| Dissolvine ® GLDA | 1 | 1 | 1 |
| Phenoxyethanol | 0.45 | 0.45 | 0.45 |
| NaOH (water solution) | 1 | 1 | 1 |
| Medley ® Brilliant 300 L | 2 | 2 | 2 |
| | Add water to 100% | Add water to 100% | Add water to 100% |
| pH | 8.0 | 8.2 | 8.1 |

| Ingredients | Detergent 212 | Detergent 213 | Detergent 214 |
|---|---|---|---|
| Na soap from palm kernel oil | 2 | 2 | 2 |
| Sodium Citrate | 6 | 6 | 6 |
| di-rhamnolipids | 15 | — | — |
| mono-rhamnolipids | — | 15 | — |
| glucolipids | — | — | 15 |
| persicomycin | 1 | 1 | 1 |
| REWOTERIC AM V | 5 | 5 | 5 |
| Dissolvine ® GLDA | 1 | 1 | 1 |
| Phenoxyethanol | 0.45 | 0.45 | 0.45 |

-continued

| Ingredients | Detergent 212 | Detergent 213 | Detergent 214 |
|---|---|---|---|
| NaOH (water solution) | 1 | 1 | 1 |
| Medley ® Brilliant 300 L | 2 | 2 | 2 |
| | Add water to 100% | Add water to 100% | Add water to 100% |
| pH | 8.0 | 8.2 | 8.1 |

| Ingredients | Detergent 301 | Detergent 302 | Detergent 303 |
|---|---|---|---|
| Na soap from palm kernel oil | 2 | 2 | 2 |
| Sodium Citrate | 6 | 6 | 6 |
| di-rhamnolipids | 10 | — | — |
| mono-rhamnolipids | — | 10 | — |
| glucolipids | — | — | 10 |
| persicomycin | 0.1 | 0.1 | 0.1 |
| SLES 3EO | 5 | 5 | 5 |
| FAEO C12-18, 7 EO | 5 | 5 | 5 |
| Dissolvine ® GLDA | 1 | 1 | 1 |
| Phenoxyethanol | 0.45 | 0.45 | 0.45 |
| NaOH (water solution) | 1 | 1 | 1 |
| Medley ® Brilliant 300 L | 2 | 2 | 2 |
| | Add water to 100% | Add water to 100% | Add water to 100% |
| pH | 8.0 | 8.2 | 8.1 |

| Ingredients | Detergent 304 | Detergent 305 | Detergent 306 |
|---|---|---|---|
| Na soap from palm kernel oil | 2 | 2 | 2 |
| Sodium Citrate | 6 | 6 | 6 |
| di-rhamnolipids | 10 | — | — |
| mono-rhamnolipids | — | 10 | — |
| glucolipids | — | — | 10 |
| persicomycin | 0.1 | 0.1 | 0.1 |
| SLES 3EO | 5 | 5 | 5 |
| FAEO C12-18, 3 EO | 5 | 5 | 5 |
| Dissolvine ® GLDA | 1 | 1 | 1 |
| Phenoxyethanol | 0.45 | 0.45 | 0.45 |
| NaOH (water solution) | 1 | 1 | 1 |
| Medley ® Brilliant 300 L | 2 | 2 | 2 |
| | Add water to 100% | Add water to 100% | Add water to 100% |
| pH | 8.0 | 8.2 | 8.1 |

| Ingredients | Detergent 307 | Detergent 308 | Detergent 309 |
|---|---|---|---|
| Na soap from palm kernel oil | 2 | 2 | 2 |
| Sodium Citrate | 6 | 6 | 6 |
| di-rhamnolipids | 10 | — | — |
| mono-rhamnolipids | — | 10 | — |
| glucolipids | — | — | 10 |
| persicomycin | 0.1 | 0.1 | 0.1 |
| SLES 3EO | 5 | 5 | 5 |
| FAEO C12-18, 4 EO | 5 | 5 | 5 |
| Dissolvine ® GLDA | 1 | 1 | 1 |
| Phenoxyethanol | 0.45 | 0.45 | 0.45 |
| NaOH (water solution) | 1 | 1 | 1 |
| Medley ® Brilliant 300 L | 2 | 2 | 2 |
| | Add water to 100% | Add water to 100% | Add water to 100% |
| pH | 8.0 | 8.2 | 8.1 |

| Ingredients | Detergent 3010 | Detergent 3011 | Detergent 3012 |
|---|---|---|---|
| Na soap from palm kernel oil | 2 | 2 | 2 |
| Sodium Citrate | 6 | 6 | 6 |
| di-rhamnolipids | 10 | — | — |
| mono-rhamnolipids | — | 10 | — |
| glucolipids | — | — | 10 |
| persicomycin | 0.1 | 0.1 | 0.1 |
| FAEO C12-18, 4 EO | 5 | 5 | 5 |
| Dissolvine ® GLDA | 1 | 1 | 1 |
| Phenoxyethanol | 0.45 | 0.45 | 0.45 |
| NaOH (water solution) | 1 | 1 | 1 |
| Medley ® Brilliant 300 L | 2 | 2 | 2 |
| | Add water to 100% | Add water to 100% | Add water to 100% |
| pH | 8.0 | 8.2 | 8.1 |

| Ingredients | Detergent 3013 | Detergent 3014 | Detergent 3015 |
|---|---|---|---|
| Na soap from palm kernel oil | 2 | 2 | 2 |
| Sodium Citrate | 6 | 6 | 6 |
| di-rhamnolipids | 10 | — | — |
| mono-rhamnolipids | — | 10 | — |
| glucolipids | — | — | 10 |
| persicomycin | 0.1 | 0.1 | 0.1 |
| SLES 3EO | 5 | 5 | 5 |
| Glucopon USP 600 (APG) | 5 | 5 | 5 |
| Dissolvine ® GLDA | 1 | 1 | 1 |
| Phenoxyethanol | 0.45 | 0.45 | 0.45 |
| NaOH (water solution) | 1 | 1 | 1 |
| Medley ® Brilliant 300 L | 2 | 2 | 2 |
| | Add water to 100% | Add water to 100% | Add water to 100% |
| pH | 8.0 | 8.2 | 8.1 |

| Ingredients | Detergent 3016 | Detergent 3017 | Detergent 3018 |
|---|---|---|---|
| Na soap from palm kernel oil | 2 | 2 | 2 |
| Sodium Citrate | 6 | 6 | 6 |
| di-rhamnolipids | 10 | — | — |
| mono-rhamnolipids | — | 10 | — |
| glucolipids | — | — | 10 |
| persicomycin | 0.1 | 0.1 | 0.1 |
| Glucopon USP 600 (APG) | 5 | 5 | 5 |
| Dissolvine ® GLDA | 1 | 1 | 1 |
| Phenoxyethanol | 0.45 | 0.45 | 0.45 |
| NaOH (water solution) | 1 | 1 | 1 |
| Medley ® Brilliant 300 L | 2 | 2 | 2 |
| | Add water to 100% | Add water to 100% | Add water to 100% |
| pH | 8.0 | 8.2 | 8.1 |

| Ingredients | Detergent 3019 | Detergent 3020 | Detergent 3021 |
|---|---|---|---|
| Na soap from palm kernel oil | 2 | 2 | 2 |
| Sodium Citrate | 6 | 6 | 6 |
| di-rhamnolipids | 10 | — | — |
| mono-rhamnolipids | — | 10 | — |
| glucolipids | — | — | 10 |
| persicomycin | 0.1 | 0.1 | 0.1 |
| Myristic acid | 2.5 | 2.5 | 2.5 |
| Dissolvine ® GLDA | 1 | 1 | 1 |

-continued

| Ingredients | Detergent 3019 | Detergent 3020 | Detergent 3021 |
|---|---|---|---|
| Phenoxyethanol | 0.45 | 0.45 | 0.45 |
| NaOH (water solution) | 1 | 1 | 1 |
| Medley ® Brilliant 300 L | 2 | 2 | 2 |
| | Add water to 100% | Add water to 100% | Add water to 100% |
| pH | 8.0 | 8.2 | 8.1 |

| Ingredients | Detergent 3022 | Detergent 3023 | Detergent 3024 |
|---|---|---|---|
| Na soap from palm kernel oil | 2 | 2 | 2 |
| Sodium Citrate | 6 | 6 | 6 |
| di-rhamnolipids | 10 | — | — |
| mono-rhamnolipids | — | 10 | — |
| glucolipids | — | — | 10 |
| persicomycin | 0.1 | 0.1 | 0.1 |
| Lauric acid | 2.5 | 2.5 | 2.5 |
| Dissolvine ® GLDA | 1 | 1 | 1 |
| Phenoxyethanol | 0.45 | 0.45 | 0.45 |
| NaOH (water solution) | 1 | 1 | 1 |
| Medley ® Brilliant 300 L | 2 | 2 | 2 |
| | Add water to 100% | Add water to 100% | Add water to 100% |
| pH | 8.0 | 8.2 | 8.1 |

| Ingredients | Detergent 3025 | Detergent 3026 | Detergent 3027 |
|---|---|---|---|
| Na soap from palm kernel oil | 2 | 2 | 2 |
| Sodium Citrate | 6 | 6 | 6 |
| di-rhamnolipids | 10 | — | — |
| mono-rhamnolipids | — | 10 | — |
| glucolipids | — | — | 10 |
| persicomycin | 0.1 | 0.1 | 0.1 |
| SLES 3EO | 5 | 5 | 5 |
| FAEO C12-18, 5 EO | 5 | 5 | 5 |
| Dissolvine ® GLDA | 1 | 1 | 1 |
| Phenoxyethanol | 0.45 | 0.45 | 0.45 |
| NaOH (water solution) | 1 | 1 | 1 |
| Medley ® Brilliant 300 L | 2 | 2 | 2 |
| | Add water to 100% | Add water to 100% | Add water to 100% |
| pH | 8.0 | 8.2 | 8.1 |

| Ingredients | Detergent 3028 | Detergent 3029 | Detergent 3030 |
|---|---|---|---|
| Na soap from palm kernel oil | 2 | 2 | 2 |
| Sodium Citrate | 6 | 6 | 6 |
| di-rhamnolipids | 10 | — | — |
| mono-rhamnolipids | — | 10 | — |
| glucolipids | — | — | 10 |
| persicomycin | 0.1 | 0.1 | 0.1 |
| SLES 3EO | 5 | 5 | 5 |
| REWOTERIC AM V | 5 | 5 | 5 |
| Dissolvine ® GLDA | 1 | 1 | 1 |
| Phenoxyethanol | 0.45 | 0.45 | 0.45 |
| NaOH (water solution) | 1 | 1 | 1 |
| Medley ® Brilliant 300 L | 2 | 2 | 2 |
| | Add water to 100% | Add water to 100% | Add water to 100% |
| pH | 8.0 | 8.2 | 8.1 |

| Ingredients | Detergent 3031 | Detergent 3032 | Detergent 3033 |
|---|---|---|---|
| Na soap from palm kernel oil | 2 | 2 | 2 |
| Sodium Citrate | 6 | 6 | 6 |
| di-rhamnolipids | 15 | — | — |
| mono-rhamnolipids | — | 15 | — |
| glucolipids | — | — | 15 |
| persicomycin | 0.1 | 0.1 | 0.1 |
| REWOTERIC AM V | 5 | 5 | 5 |
| Dissolvine ® GLDA | 1 | 1 | 1 |
| Phenoxyethanol | 0.45 | 0.45 | 0.45 |
| NaOH (water solution) | 1 | 1 | 1 |
| Medley ® Brilliant 300 L | 2 | 2 | 2 |
| | Add water to 100% | Add water to 100% | Add water to 100% |
| pH | 8.0 | 8.2 | 8.1 |

| Ingredients | Detergent 3034 | Detergent 3035 | Detergent 3036 |
|---|---|---|---|
| Na soap from palm kernel oil | 2 | 2 | 2 |
| Sodium Citrate | 6 | 6 | 6 |
| di-rhamnolipids | 10 | — | — |
| mono-rhamnolipids | — | 10 | — |
| glucolipids | — | — | 10 |
| persicomycin | 0.1 | 0.1 | 0.1 |
| SLES 3EO | 5 | 5 | 5 |
| Neutrol ® MGDA | 1 | 1 | 1 |
| Phenoxyethanol | 0.45 | 0.45 | 0.45 |
| NaOH (water solution) | 1 | 1 | 1 |
| Medley ® Brilliant 300 L | 2 | 2 | 2 |
| | Add water to 100% | Add water to 100% | Add water to 100% |
| pH | 8.0 | 8.2 | 8.1 |
| Na soap from palm kernel oil | 2 | 2 | 2 |
| Sodium Citrate | 6 | 6 | 6 |
| di-rhamnolipids | 10 | — | — |
| mono-rhamnolipids | — | 10 | — |
| glucolipids | — | — | 10 |
| persicomycin | 0.1 | 0.1 | 0.1 |
| SLES 3EO | 5 | 5 | 5 |
| FAEO C12-18, 4 EO | 3 | 3 | 3 |
| Trilon ® M | 1 | 1 | 1 |
| Phenoxyethanol | 0.45 | 0.45 | 0.45 |
| NaOH (water solution) | 1 | 1 | 1 |
| Medley ® Brilliant 300 L | 2 | 2 | 2 |
| | Add water to 100% | Add water to 100% | Add water to 100% |
| pH | 8.0 | 8.2 | 8.1 |

| Ingredients | Detergent 3037 | Detergent 3038 | Detergent 3039 |
|---|---|---|---|
| Na soap from palm kernel oil | 2 | 2 | 2 |
| Sodium Citrate | 6 | 6 | 6 |
| di-rhamnolipids | 10 | — | — |
| mono-rhamnolipids | — | 10 | — |
| glucolipids | — | — | 10 |
| persicomycin | 0.1 | 0.1 | 0.1 |
| SLES 3EO | 5 | 5 | 5 |
| Glucopon ®215P | 3 | 3 | 3 |
| Trilon ® M | 1 | 1 | 1 |
| Phenoxyethanol | 0.45 | 0.45 | 0.45 |
| NaOH (water solution) | 1 | 1 | 1 |

-continued

| Ingredients | Detergent 3037 | Detergent 3038 | Detergent 3039 |
|---|---|---|---|
| Medley ® Brilliant 300 L | 2 | 2 | 2 |
| | Add water to 100% | Add water to 100% | Add water to 100% |
| pH | 8.0 | 8.2 | 8.1 |

| Ingredients | Detergent 3040 | Detergent 3041 | Detergent 3042 |
|---|---|---|---|
| Na soap from palm kernel oil | 2 | 2 | 2 |
| Sodium Citrate | 6 | 6 | 6 |
| di-rhamnolipids | 10 | — | — |
| mono-rhamnolipids | — | 10 | — |
| glucolipids | — | — | 10 |
| persicomycin | 0.1 | 0.1 | 0.1 |
| Glucopon ®215P | 5 | 5 | 5 |
| Trilon ® M | 1 | 1 | 1 |
| Phenoxyethanol | 0.45 | 0.45 | 0.45 |
| NaOH (water solution) | 1 | 1 | 1 |
| Medley ® Brilliant 300 L | 2 | 2 | 2 |
| | Add water to 100% | Add water to 100% | Add water to 100% |
| pH | 8.0 | 8.2 | 8.1 |

| Ingredients | Detergent 3043 | Detergent 3044 | Detergent 3045 |
|---|---|---|---|
| Na soap from palm kernel oil | 2 | 2 | 2 |
| Sodium Citrate | 6 | 6 | 6 |
| di-rhamnolipids | 10 | — | — |
| mono-rhamnolipids | — | 10 | — |
| glucolipids | — | — | 10 |
| persicomycin | 0.1 | 0.1 | 0.1 |
| Pelargonic acid | 5 | 5 | 5 |
| Trilon ® M | 1 | 1 | 1 |
| Phenoxyethanol | 0.45 | 0.45 | 0.45 |
| NaOH (water solution) | 1 | 1 | 1 |
| Medley ® Brilliant 300 L | 2 | 2 | 2 |
| | Add water to 100% | Add water to 100% | Add water to 100% |
| pH | 8.0 | 8.2 | 8.1 |

| Ingredients | Detergent 3046 | Detergent 3047 | Detergent 3048 |
|---|---|---|---|
| Na soap from palm kernel oil | 2 | 2 | 2 |
| Sodium Citrate | 6 | 6 | 6 |
| di-rhamnolipids | 10 | — | — |
| mono-rhamnolipids | — | 10 | — |
| glucolipids | — | — | 10 |
| persicomycin | 0.1 | 0.1 | 0.1 |
| Oleic acid | 5 | 5 | 5 |
| Trilon ® M | 1 | 1 | 1 |
| Phenoxyethanol | 0.45 | 0.45 | 0.45 |
| NaOH (water solution) | 1 | 1 | 1 |
| Medley ® Brilliant 300 L | 2 | 2 | 2 |
| | Add water to 100% | Add water to 100% | Add water to 100% |
| pH | 8.0 | 8.2 | 8.1 |

| Ingredients | Detergent 3049 | Detergent 3050 | Detergent 3051 |
|---|---|---|---|
| Na soap from palm kernel oil | 2 | 2 | 2 |
| Sodium Citrate | 6 | 6 | 6 |
| di-rhamnolipids | 10 | — | — |
| mono-rhamnolipids | — | 10 | — |
| glucolipids | — | — | 10 |
| persicomycin | 0.1 | 0.1 | 0.1 |
| Palmitic acid | 5 | 5 | 5 |
| Trilon ® M | 1 | 1 | 1 |
| Phenoxyethanol | 0.45 | 0.45 | 0.45 |
| NaOH (water solution) | 1 | 1 | 1 |
| Medley ® Brilliant 300 L | 2 | 2 | 2 |
| | Add water to 100% | Add water to 100% | Add water to 100% |
| pH | 8.0 | 8.2 | 8.1 |

| Ingredients | Detergent 3052 | Detergent 3053 | Detergent 3054 |
|---|---|---|---|
| MEA soap from palm kernel oil | 2 | 2 | 2 |
| Sodium Citrate | 6 | 6 | 6 |
| di-rhamnolipids | 10 | — | — |
| mono-rhamnolipids | — | 10 | — |
| glucolipids | — | — | 10 |
| persicomycin | 0.1 | 0.1 | 0.1 |
| SLES | 5 | 5 | 5 |
| Trilon ® M | 1 | 1 | 1 |
| Phenoxyethanol | 0.45 | 0.45 | 0.45 |
| Monoethanol amine | 1.1 | 1.1 | 1.1 |
| Medley ® Brilliant 300 L | 2 | 2 | 2 |
| | Add water to 100 % | Add water to 100 % | Add water to 100 % |
| pH | 8.0 | 8.2 | 8.1 |

| Ingredient | Pouch 1 | Pouch 2 | Pouch 3 |
|---|---|---|---|
| Di-rhamnolipid | 10 | 0 | 0 |
| Glucolipids | 0 | 10 | 0 |
| Mono-rhamnolipids | 0 | 0 | 10 |
| Persicomycin | 0.1 | 0.1 | 0.1 |
| Sodium laureth sulfate | 0 | 0 | 10 |
| Fatty alcohol ethoxylate (C12-14, 7EO) | 14 | 14 | 14 |
| Fatty acid (C8-C18) | 13 | 13 | 13 |
| 1,2-propane diol | 22 | 22 | 22 |
| Glycerine | 22 | 22 | 22 |
| Sodium Hydroxide | 4 | 4 | 4 |
| Citric acid | to pH 8 | to pH 8 | to pH 8 |
| Medley ® Brilliant 300 L | 3 | 3 | 3 |
| Water | Add to 100% | Add to 100% | Add to 100% |

| Ingredient | Pouch 4 | Pouch 5 | Pouch 6 |
|---|---|---|---|
| Di-rhamnolipid | 10 | 0 | 0 |
| Glucolipids | 0 | 10 | 0 |
| Mono-rhamnolipids | 0 | 0 | 10 |
| Persicomycin | 0.1 | 0.1 | 0.1 |
| Sodium laureth sulfate | 0 | 0 | 10 |
| Fatty alcohol ethoxylate (C12-14, 3EO) | 14 | 14 | 14 |
| Fatty acid (C8-C18) | 13 | 13 | 13 |
| 1,2-propane diol | 22 | 22 | 22 |
| Glycerine | 22 | 22 | 22 |
| Sodium Hydroxide | 4 | 4 | 4 |

-continued

| Ingredient | Pouch 4 | Pouch 5 | Pouch 6 |
|---|---|---|---|
| Citric acid | to pH 8 | to pH 8 | to pH 8 |
| Medley ® Brilliant 300 L | 3 | 3 | 3 |
| Water | Add to 100% | Add to 100% | Add to 100% |

The invention claimed is:

1. A composition, comprising:

A) at least one biosurfactant, and

B) at least one persicomycin which is a 3-(3'-hydroxy) hydroxy fatty acid or salt thereof, wherein the biosurfactant is other than a persicomycin and is selected from the group consisting of rhamnolipids, glucolipids, and sophorolipids, and wherein the composition has a sum of A) and B) in an amount of from 2.0 wt.-% to 60 wt.-%, wherein percentages by weight refer to the total composition, and wherein a ratio of component B) to component A) is in a range of 1:2000 to 1:3.

2. The composition according to claim 1, wherein the biosurfactant is selected from the group consisting of rhamnolipids and glucolipids.

3. The composition according to claim 1, further comprising:

C) at least one enzyme.

4. The composition according to claim 3, wherein the composition has C) in an amount of from 0.2 wt.-% to 10 wt.-%, where the percentages by weight refers to the total composition.

5. The composition according to claim 1, further comprising:

at least one non-biosurfactant.

6. The composition according to claim 1, further comprising:

at least one polymer selected from the group consisting of anti-redeposition polymers and soil release polymers.

7. The composition according to claim 6, wherein the at least one anti-redeposition polymer or soil release polymer is selected from the group consisting of modified cellulose, modified starch, modified inulin, polyitaconic acid, polyvinylpyrrolidone, polyvinyl alcohol, and polyethylene glycol.

8. A process for cleaning a surface of an article, the process comprising:

a) providing a composition according to claim 1 and an article, b) combining the provided composition and the provided article with water, c) maintaining a temperature of the water comprising the provided composition and the provided article in a temperature range of from 15° C. to 100° C., over a period of time of from 5 minutes to 240 minutes, while tentatively moving the provided article in the water, d) separating the article from the water, and optionally e) rinsing the article with further water.

9. The process according to claim 8, wherein a weight ratio of the provided article and water in b) and c) is in a range of from 1:2 to 1:30.

10. The process according to claim 8, wherein in b) per kg of water 0.1 g to 50 g of the composition is provided.

11. A method for cleaning a surface of an article, the method comprising:

cleaning the surface of the article with a composition according to claim 1.

12. The method according to claim 11, wherein the surface of the article is cleaned from fat and/or oil.

13. The composition according to claim 3, wherein the ratio of component B) to component A) is in a range of 1:100 to 1:25.

14. The composition according to claim 1, wherein the composition has a sum of A) and B) in an amount of from 10 wt.-% to 30 wt.-%.

15. The composition according to claim 3, wherein the enzyme is selected from the group consisting of protease, amylase, lipase, pectinase, cellulase, phosphodiesterase, mannanase, cutinase, pectate lyase, peroxidase, oxidase, and laccase.

16. The composition according to claim 1, wherein the biosurfactant is selected from the group consisting of rhamnolipids.

17. The composition according to claim 1, wherein the persicomycin is 3-(3'-hydroxydecanoyloxy) hexadecenoic acid.

18. The composition according to claim 1, wherein the ratio of component B) to component A) is in a range of 1:1000 to 1:10.

19. The composition according to claim 1, wherein B) is present in an amount of 0.05 to 5 percent by weight based on the total weight of the composition.

20. The composition according to claim 19, wherein A) is present in an amount of 5 to 20 percent by weight based on the total weight of the composition.

* * * * *